(12) United States Patent
Hirata et al.

(10) Patent No.: US 8,441,582 B2
(45) Date of Patent: May 14, 2013

(54) IMAGING DISPLAYING APPARATUS AND 3-D IMAGE DISPLAYING APPARATUS APPLYING THE SAME THEREIN

(75) Inventors: Koji Hirata, Yokohama (JP); Masahiko Yatsu, Fujisawa (JP); Hidehiro Ikeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1136 days.

(21) Appl. No.: 12/153,221

(22) Filed: May 15, 2008

(65) Prior Publication Data

US 2008/0284921 A1    Nov. 20, 2008

(30) Foreign Application Priority Data

May 16, 2007    (JP) ................................ 2007-130003

(51) Int. Cl.
*H04N 5/74*        (2006.01)
(52) U.S. Cl.
USPC ............................ 348/756; 348/758; 348/759
(58) Field of Classification Search ..................... None
See application file for complete search history.

(56) References Cited

U.S. PATENT DOCUMENTS

| | | | |
|---|---|---|---|
| 2003/0202259 A1* | 10/2003 | Nishimae et al. | 359/726 |
| 2004/0008156 A1* | 1/2004 | Kuroda et al. | 345/6 |
| 2005/0157366 A1* | 7/2005 | Asahi et al. | 359/238 |
| 2006/0250676 A1* | 11/2006 | Hagood, IV | 359/296 |
| 2007/0103644 A1* | 5/2007 | Nakamura et al. | 353/31 |

FOREIGN PATENT DOCUMENTS

| | | |
|---|---|---|
| JP | 3022558 | 1/2000 |
| JP | 2000-214413 | 8/2000 |
| JP | 2005-111066 | 4/2005 |

\* cited by examiner

*Primary Examiner* — Brian Pendleton
*Assistant Examiner* — Jean D Saint Cyr
(74) *Attorney, Agent, or Firm* — Antonelli, Terry, Stout & Kraus, LLP.

(57) ABSTRACT

An image displaying apparatus, comprising: a first light modulator unit, which is configured to modulate a light incident thereon, responding to a first video signal, thereby to form a first image; one or a plural number of second light modulator units, which is/are configured to modulate a light from a light source, responding to a second video signal; and an enlarged image forming unit, being disposed on a light incidence side of the first light modulator unit, upon which a light modulated within the second light modulator unit is projected, enlargedly, thereby to form a second image thereon, wherein upon the first light modulator unit is incident the light of the second image formed on the enlarged image forming unit, and the first image is formed through modulation of the light of the second image responding to the first video signal.

20 Claims, 17 Drawing Sheets

FIG.3
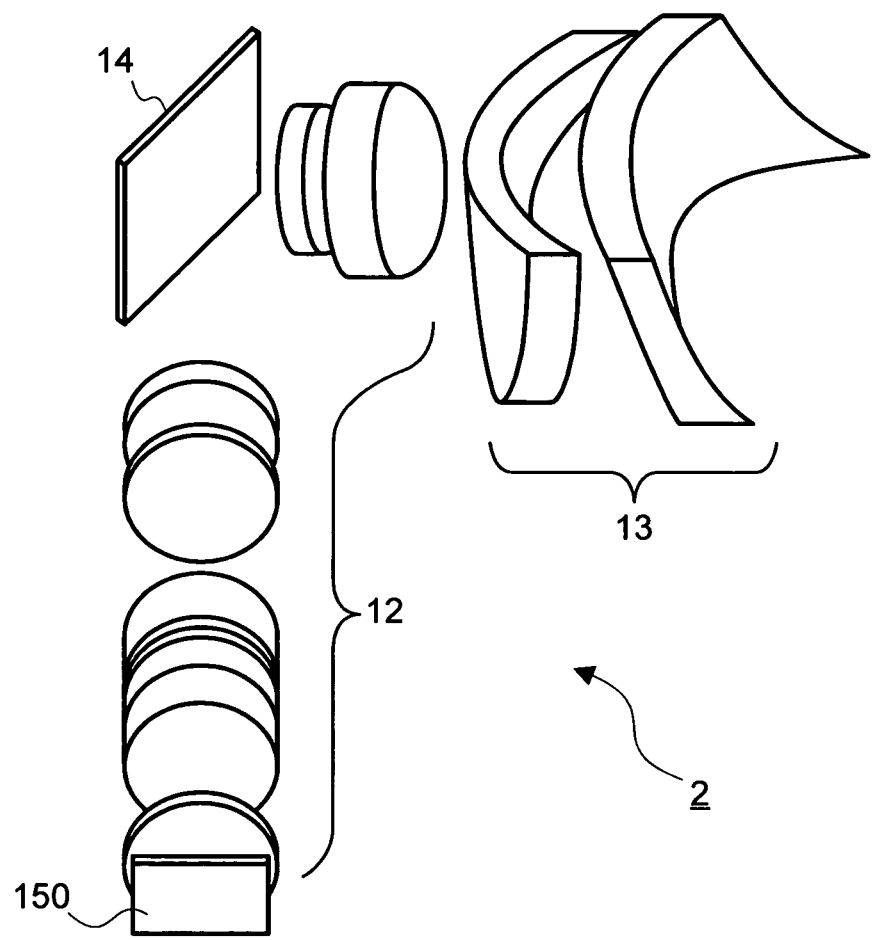
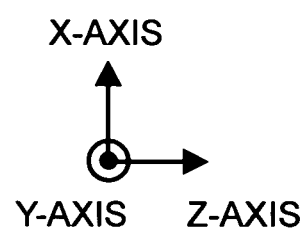

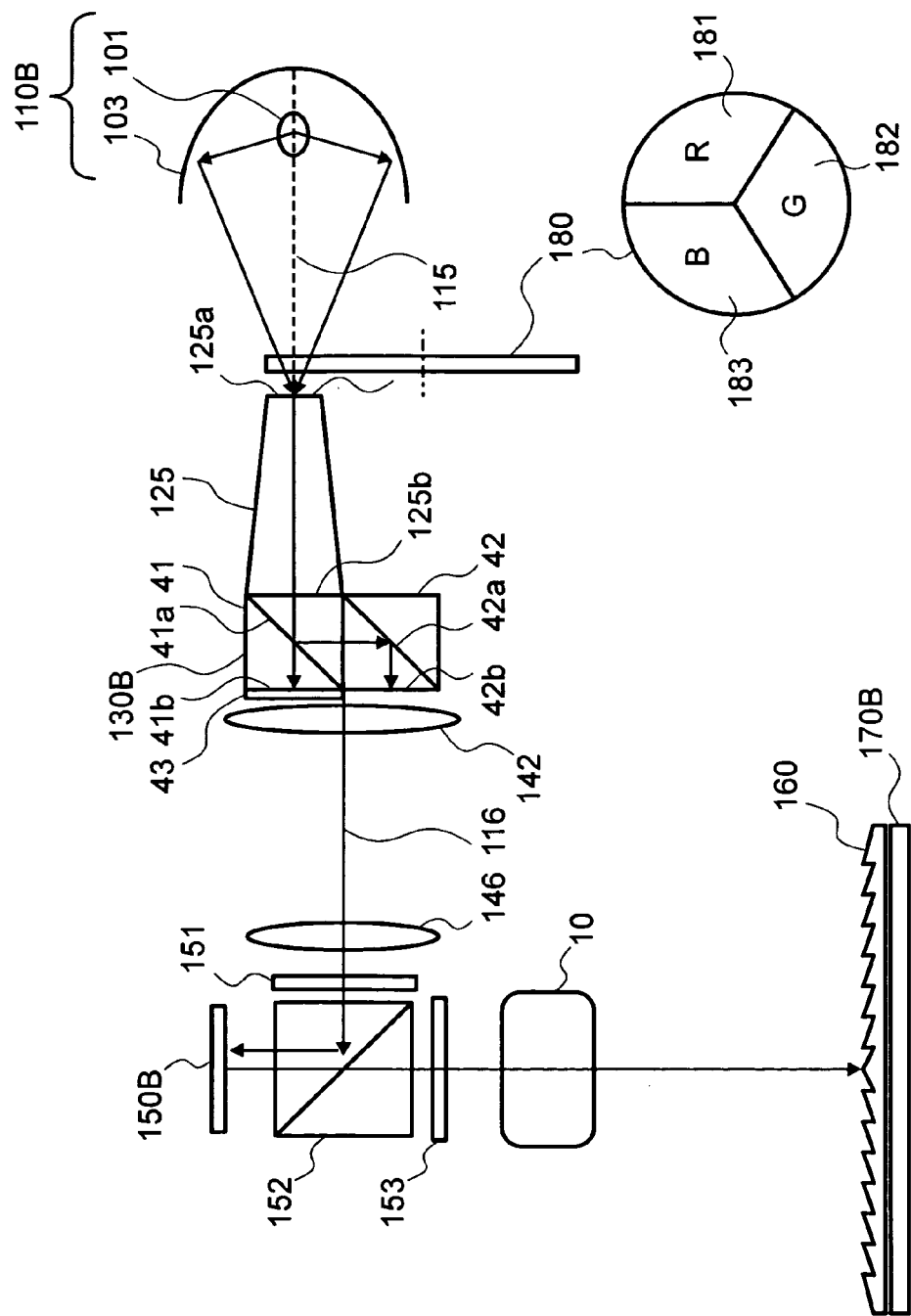

IMAGING DISPLAYING APPARATUS AND 3-D IMAGE DISPLAYING APPARATUS APPLYING THE SAME THEREIN

BACKGROUND OF THE INVENTION

The present invention relates to an image displaying apparatus for displaying a plural number of two-dimensional (2-D) images on a plural number of display surfaces or screens, which are located at positions differing from each other, in the depth direction of a set seeing from a side of an observer or viewer, and it relates, in particular, to an image displaying apparatus, which can be provided, cheaply, even if enlarging the screen size of the 2-D image.

In recent years, accompanying an announcement of stoppage of the analog terrestrial broadcasting, expected in the year 2011, an image displaying apparatus is widely spreading, of a direct-view type, having a large display, enabling to receive so-called a high vision broadcasting of high-definition (for example, 1,920×1,080 pixels), which was already started, and a digital terrestrial TV (television) broadcasting of high-quality.

In general, as a thin-type display panel within such image displaying apparatus of the direct-view type is applied a PDP (Plasma Display Panel) or a liquid crystal panel; however, the liquid crystal panel is inferior in contrast (or may be called "contrast ratio") by an about one (1) digit thereof, comparing to the PDP. On the other hand, for the PDP, there is still remained a problem to be dissolved, i.e., brightness is short when displaying a white all over the entire screen thereof, etc. Also, though a ratio of the panel is large, occupying within a total cost of the image displaying apparatus of the thin direct-view type, but since a unit const of the panel falls down, greatly, due to a feeling of overproduction thereof accompanying with a large-scaled initial investments by panel makers, a set price also generates a price fall-down following with it, at 20% or more per a year, for example.

For this reason, every company of the set makers continues development of the image displaying apparatus having a high additive value, and therefore a main product of products line-up is shifted, in particular, the resolution of the panel, from XGA (1,024×768 pixels) into a type for enabling to receive the high vision broadcasting of high-definition (1,920×1,080 pixels). Further, as a next step thereafter, developments become more serious about a 3-D image displaying apparatus, which can display a 3-D stereoscopic image (hereinafter, being called "3-D image").

As a 3-D display method for displaying such the 3-D image (e.g., the 3-D stereoscopic image), at an initial stage of the developments, is already well-known a liquid crystal shutter glasses method, wherein an image (e.g., 2-D image) for a right eye and an image (e.g., 2-D image) for a left eye are exchanged, per one (1) field of an image signal, while the liquid crystal shutters installed into the glasses in synchronism with this. However, with this method, since a pair of the liquid crystal shutter glasses is necessary, it is very inconvenient, upon an actual use thereof. Also, since an adjustment of a focus must be made by naked eyes, upon the surfaces, on which the 2-D images are displayed (hereinafter, being called "a display surface or screen"), there is also generated other physiological problem, i.e., fatigue of the eyes or eyestrain.

A 3-D displaying method for dissolving such problems mentioned above, and a 3-D image displaying apparatus applying the same therein are already known, in the following Patent Document 1.

[Patent Document 1] Japanese Patent No. 3022558

BRIEF SUMMARY OF THE INVENTION

In the Patent Document 1 is disclosed the 3-D displaying method, i.e., 2-D images are produced by projecting a display object on a plural number of display surfaces or screens, located at positions different from each other in the depth direction of the set, from eye directions of an observer or viewer (hereinafter, the 2-D image is called, simply, an "image", as far as no doubt is generated thereof), and brightness is controlled for each of those images, separately and independently, and thereby obtaining the 3-D image with less feeling of physical disorder. In this 3-D displaying method, for example, keeping the total brightness when seeing the object from the observer at constant, the brightness of the image on the display surface or screen is increased as it is near to the observer while the brightness is lowered as it is far from the observer. With this, in spite of that actually displayed thereon are the 2-D images, but due to the physiological or the psychological factor or illusion, the observer can feel a 3-D image standing between the plural numbers of display surfaces or screens.

Also, in the Patent Document 1 discloses a plural number of embodiments of the 3-D image displaying apparatus, applying the 3-D display method mentioned above therein.

For example, as a first embodiment of the 3-D image displaying apparatus (see FIG. 20 of the Patent Document 1) is disclosed an optical system of disposing the images of a plural number of 2-D image displaying apparatuses (for example, a CRT, a liquid crystal display, a LED display, a plasma display, a FED display, a DMD display, a projection-type display, a line-drawing type display, etc.) on display surfaces or screens (or, positions), each differing from other in the depth direction, by means of half mirrors. However, with this 3-D image displaying apparatus, for the purpose of obtaining a large-sized 3-D image, the apparatus becomes to be large in the scale thereof (in particular, an expansion of the apparatus in the depth direction thereof), and further it is high in the cost thereof. Moreover, because of use of the half mirrors therein, an efficiency of utilizing a light is lowered, and the brightness of the apparatus comes down to be small.

In the 3-D image displaying apparatus, as a second embodiment (see FIG. 21 of the Patent Document 1) is disclosed an optical system, i.e., providing shutter elements for conducting transmission/shutoff of lights, in front of plural numbers of projectors, respectively, as well as, disposing dispersion plates for controlling dispersion/transmission or reflection/transmission of lights, at the image formation positions of the projection images, respectively, so as to drive timing of the dispersion/transmission of the dispersion plate in synchronism with timing of the transmission/shutoff of the shutter element, and thereby controlling the positions of the images formed on the dispersion plates, in the depth thereof, in a manner of time-sharing. However, with this 3-D image displaying apparatus, for the purpose of obtaining a large-sized 3-D image, the apparatus becomes to be large in the scale thereof (in particular, an expansion of the apparatus in the depth direction thereof). Moreover, the dispersion plates for controlling dispersion/transmission or reflection/transmission are very expensive in the price, in particular, when enlarging them.

In the 3-D image displaying apparatus described as a third embodiment (see FIG. 22 of the Patent Document 1) is disclosed an optical system, for displaying a plural number of images formed within the 3-D image displaying apparatus, in an outside of that 3-D image displaying apparatus. However, it is difficult to design a lens optical system 183 for converting the plural number of images formed within the 3-D image displaying apparatus onto display surfaces or screens in the outside of that 3-D image displaying apparatus. In the similar manner, it is also difficult to execute the configuration control of a bifocal mirror, which is described in a fourth embodiment (see FIG. 23 of the Patent Document 1), and therefore it is not realistic idea. Further, with the embodiment described thereafter (for example, see FIG. 24 of the Patent Document 1), not only it is difficult to produce, because of a high technical hurdle thereof, but also there are many factors of brining about a cost up, for achieving the 3-D image displaying apparatus, and therefore there is a high possibility of resulting into a very high price.

According to the present invention, taking the problems mentioned above into the consideration thereof, an object thereof is to provide an image displaying apparatus, being suitable for 3-D image display, as well as, enabling to display a plural number of images of high quality at the same time, but with a low cost.

For accomplishing the object mentioned above, according to the present invention, there is provided an image displaying apparatus, comprising: a first light modulator unit for use of display, which is provided at a position nearest to an observer, thereby converting a light from a light source into a video signal; a second light modulator unit having a display surface or screen being smaller than said light conversion unit for use of display; and further a projection apparatus for projecting the light modulated through said second light modulator unit onto the first light modulator unit, enlargedly.

With such structures mentioned above, a first 2-D image can be obtained with conducting light modulation upon a light amount, which is emitted from the light source, by a unit of pixel, through the second light modulator unit. Further, this image light modulated is applied as an input light onto the first display light modulator unit by means of the projection lens apparatus, and therefore it is possible to obtain a second 2-D image. As a result of this, a plural number of 2-D images can be displayed. If increasing a number of 2-D images, by increasing a number of pairs of the second light modulator unit and the projection lens apparatus, there can be obtain an image displaying apparatus for enabling to display a further real 3-D image thereon.

According to the present method, since it is possible to bring the size of the second light modulator unit to be small, a large-sized 3-D display apparatus can be obtained, with a low cost, even if increasing the number of the screens of 2-D image display. Further, transmission of the light through the polarizing plates a plural number of times enables to bring about other effect, i.e., increasing the contrast characteristic of the screen, greatly.

Further, between the light source and the second light modulator unit is provided a polarized light converter unit for converting the light without polarization from said light source into a desired polarization component, then it is possible to utilize the light from the light source, with high efficiency.

As was mentioned above, according to the present invention, it is possible obtain an image displaying apparatus of high picture quality, with a low cost, and also a 3-D display apparatus applying the same therein.

BRIEF DESCRIPTION OF THE SEVERAL DRAWINGS

Those and other objects, features and advantages of the present invention will become more readily apparent from the following detailed description when taken in conjunction with the accompanying drawings wherein:

FIG. 3 is a perspective view of projection lenses for building up the projection lens device;

FIG. 15 is a diagrammatical structural view an image displaying apparatus, according to an embodiment 3;

Figure 16A:
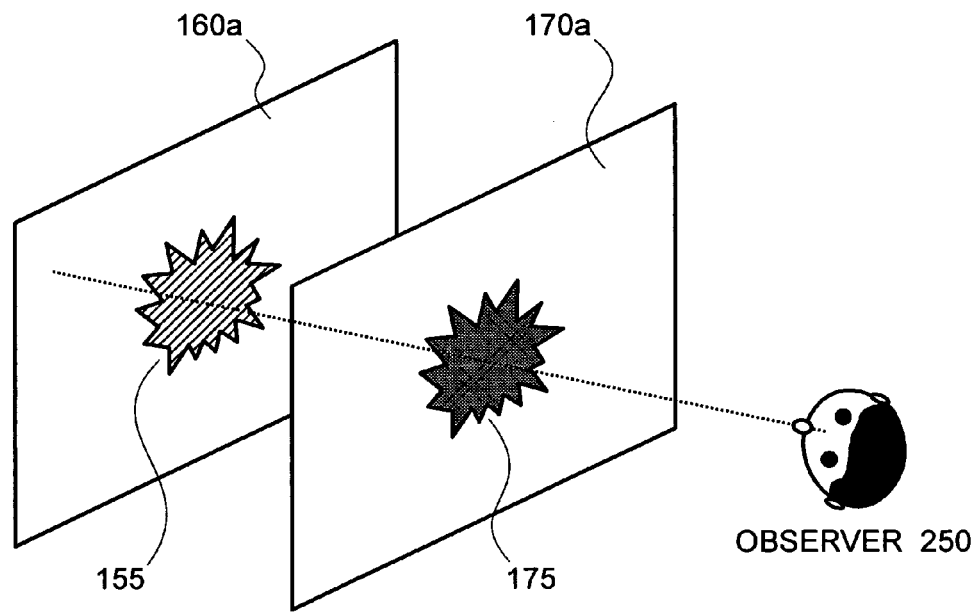
Figure 16B:
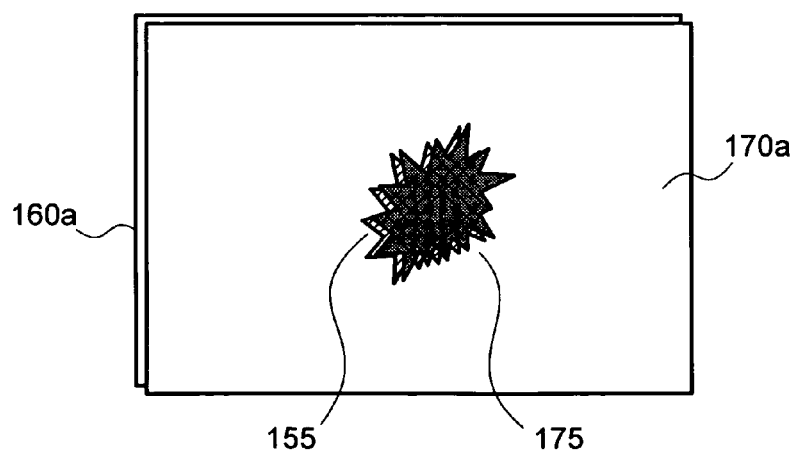
Figure 17:
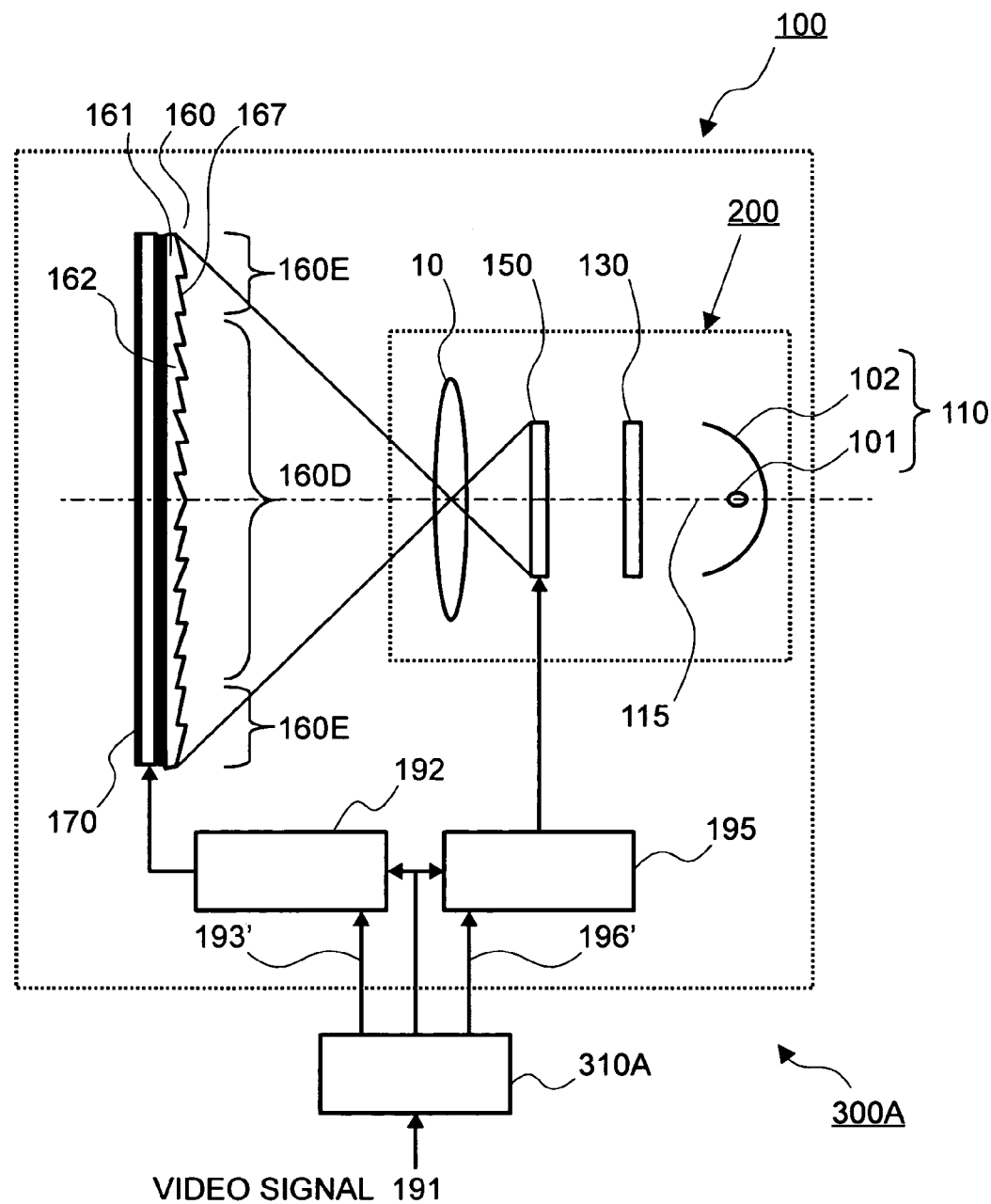

FIGS. 16(a) and 16(b) are views for explaining the principle of a 3-D display method, according to the present embodiment; and FIG. 17 is a structural view for showing a variation of a 3-D image displaying apparatus, diagrammatically, according to an embodiment of the present invention.

DETAILED DESCRIPTION OF THE PREFERRED EMBODIMENTS

Hereinafter, embodiments according to the present invention will be fully explained by referring to the attached drawings. However, in each of the drawings are shown elements having the same function, being attached with the same reference numeral, and duplication of explanation will be omitted, about the element which was explained once. Also, for the purpose of simplifying the explanation thereof, explanation will be given on a case where the 2-D images are displayed on two (2) pieces of display surfaces or screens; however, the present invention should not be only to this. Thus, it is needless to say that similar effects, which will be mentioned later, can be obtained if providing the display surfaces or screens more than two (2) pieces.

Before explaining the present embodiment, first of all, explanation will be given on the principle of the 3-D display method disclosed in the Patent Document 1, to be applied in the 3-D stereographic display, within an image displaying apparatus according to the present embodiment.

FIGS. 16(a) and 16(b) are views for explaining the principle of the 3-D display method, in relation with the present embodiment, wherein FIG. 16(a) is a perspective view thereof, and FIG. 16(b) is a view when seeing it from a front thereof.

As shown in FIGS. 16(a) and 16(b), in a front of an observer 250 who is observing or viewing an image are provided a plural number of display surfaces or screens at positions differing from each other in the depth direction thereof, for example, a first display surface or screen 170a and a second display surface or screen 160a, and on those display surfaces or screens are displayed two (2) pieces of images (i.e., the 2-D images), e.g., a first image 175 and a second image 155, with using an image displaying apparatus according to the present embodiment, which will be mentioned later. Further, the first display surface or screen 170a corresponds to a display surface or screen (i.e., an image display surface) of a liquid crystal panel 170 for use of image display (hereinafter, an "image display liquid crystal panel") as a first light modulator unit, which will be mentioned later, and the second display surface or screen 160a corresponds to a projection image surface (i.e., an image formation surface), on which is projected, enlargedly, the display surface or screen (i.e., the image display surface) of the liquid crystal panel 150, as a second light modulator unit, which will be mentioned later, through a projection lens apparatus or device 10.

Figure 2:
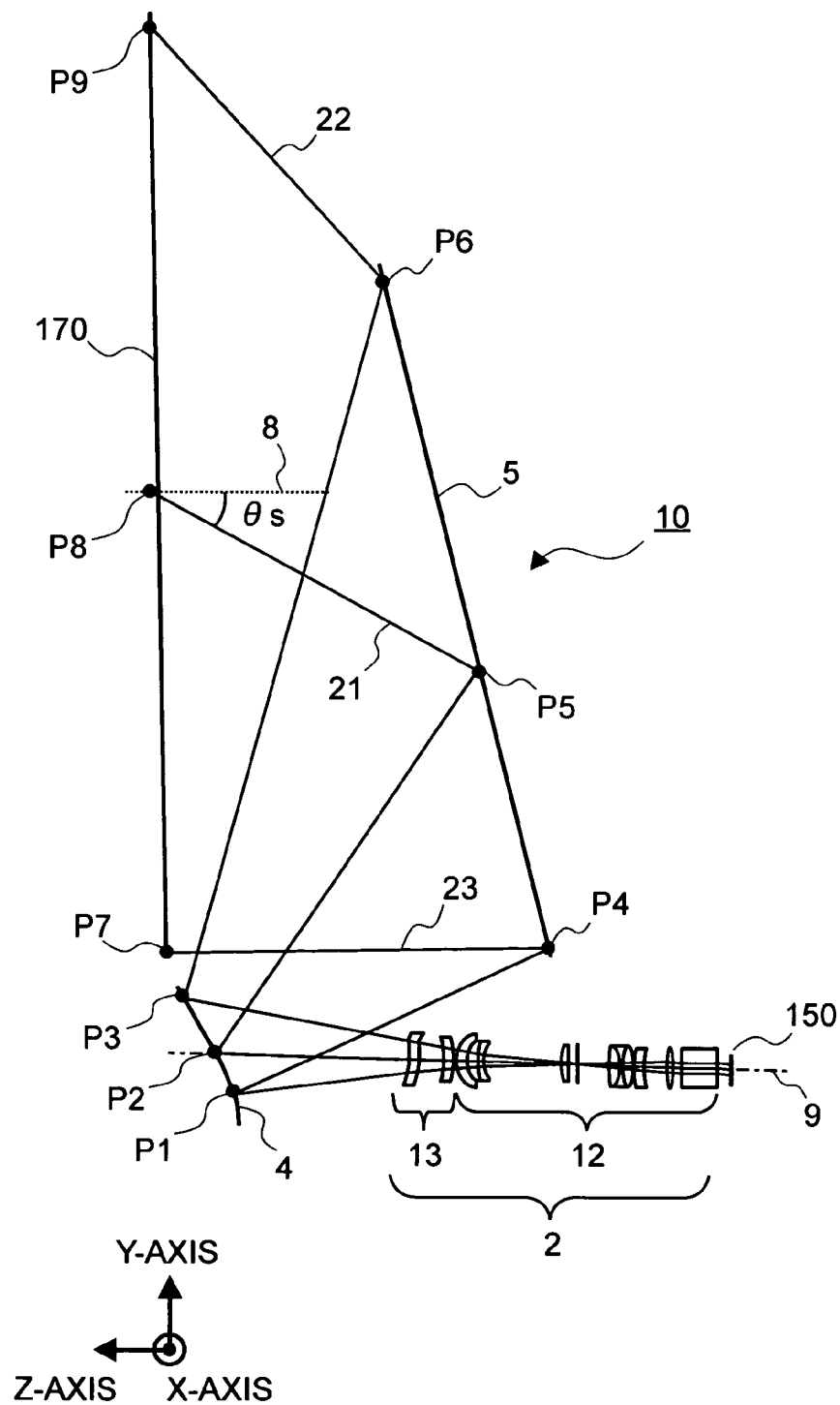
FIG. 2 is a cross-section view for showing the structures of a basic optical system of a projection lens apparatus or device, within the optical displaying apparatus, according to the present invention.

The images (i.e., the 2-D images) 175 and 155 to be displayed on the first display surface or screen 170a and the second display surface or screen 160a are ones, as is mentioned in FIG. 2 of the Patent Document 1, which can be obtained by projecting a 3-D substance (i.e., an object of displaying) to be presented to the observer, from visual axes of both eyes of the observer onto the display surfaces or screens 170a and 160a.

As a method for producing the images projected on those display surfaces or screens 170a and 160a can be listed up various kinds of method, such as, a method of using the 2-D images, which can be obtained by photographing the 3-D substance from the directions of visual axes, or a method of synthesizing them from a plural number of the 2-D images, which can be obtained by photographing it from different directions, or a method of using a synthesizing technology and/or modeling, etc., with an aid of a computer graphic, for example. However, a first image signal and a second image signal to be used within the image displaying apparatus, according to the present embodiment, which will be mentioned later, are produced with using any one of those, wherein the first image signal corresponds to the first image, and the second image signal corresponds to the second image, and they have signal components differing from each other, in many cases.

On the other hand, other than the methods shown in the Patent Document 1, while displaying two (2) kinds of images onto the image displaying apparatus, which is manufactured for the purpose of trial use, the present inventors also confirm that a pseudo-3-D display can be visually recognized, even if contents on a display screen are same, by changing sizes of the first image and the second image, or setting levels of the brightness signals to be different from. Also, with an increase of number of the second images, it is possible to obtain a real 3-D image much more.

The first image 175 and the second image 155, which are produced in such manner, are displayed on both the first display surface or screen 170a and the second display surface or screen 160a, respectively, so that they overlap each other, seeing them from a point on a line connecting a right-hand side eye and a left-hand side eye of the observer 250. In an image displaying apparatus, according to the present embodiment, which will be mentioned later, since a size of the display surface or screen is sufficiently large, such as, approximately 27 to 100 inches, and further an optimal display distance can be obtained by fitting a distance "L", between the first display surface or screen 170a and the second display surface or screen 160a, to the screen size, from almost 0 mm to about 50 mm, for example, and therefore it is possible to satisfy this condition.

And, for the purpose that the observer can feel the 3-D image (3-D stereoscopic image) from two (2) pieces of images (2-D images), the brightness is changed depending upon a depth position of the 3-D substance from the observer, while keeping a total brightness seeing from the observer 250 at a constant.

An example of changing the brightness will be explained, by referring to FIGS. 16(a) and 16(b). However, herein, for an easy understanding, a part having high brightness is shown to be dark.

Thus, for example, while keeping the total brightness seeing from the observer 250 at a constant, the brightness of the image locating nearer to the observer (herein, the first display surface or screen 170a) is increased, while the brightness of the image locating farther from the observer (herein, the second display surface or screen 155a) is lowered. With this, the observer feels that the 3-D image is positioning between the plural number of the display surfaces or screens (herein, the first display surface or screen 170a and the second display surface or screen 155a), in spite of the fact that what are displayed are the 2-D images, due to the physiological or the psychological factor or illusion.

With using the 3-D display method mentioned in the above, a plural number of images (i.e., the 2-D images) can be formed upon the plural number of display surfaces or screens, different from each other in the depth position, seeing from the observer, and thereby enabling to display the 3-D image (i.e., a stereoscopic view).

Next, explanation will be made on an image displaying apparatus, according to the present embodiment.

The image displaying apparatus, according to the present embodiment, comprises at least two (2) sets of light modulator units, each of which forms an optical image thereon, as an image, for the purpose of forming the plural number of images (2-D images) upon the plural number of display surfaces or screens, different from each other in the depth position seeing from the observer, respectively. And, it further comprises a first light modulator unit for forming a first image, through light modulation of an incident light depending on the first video signal, one or a plural number of a second light modulator unit, for conducting light modulation on a light from a light source depending on the second video signal, and an enlarged image forming unit, being disposed on a light-incidence side of the first light modulator unit mentioned above, for forming (or representing) the second image in vicinity of the light-incidence side of the first light modulator unit by projecting the light, which is optically modulated within the second light modulator unit mentioned above, wherein the first light modulator unit mentioned above, upon which is incident the light of the said second image, which is formed within the said enlarged image forming unit, forms the first image through light modulation of the light of the said second image depending on the said first video signal. In the present embodiment, as was mentioned above, an optical image (i.e., an image) formed within the second light modulator unit is enlargedly projected (representing) within the enlarged image forming unit, thereby obtaining the second image. Accordingly, comparing to the screen size of the first light modulator unit, the screen size of the second light modulator unit can be made sufficiently small, and therefore it is possible to achieve an image displaying apparatus of a low cost and also a 3-D image displaying apparatus applying this therein. However, in the explanation below, for distinguishing the optical image (i.e., the image) formed on the second light modulator unit from the second image enlargedly projected, it will be called, an "original image" or "second original image".

Figure 1:
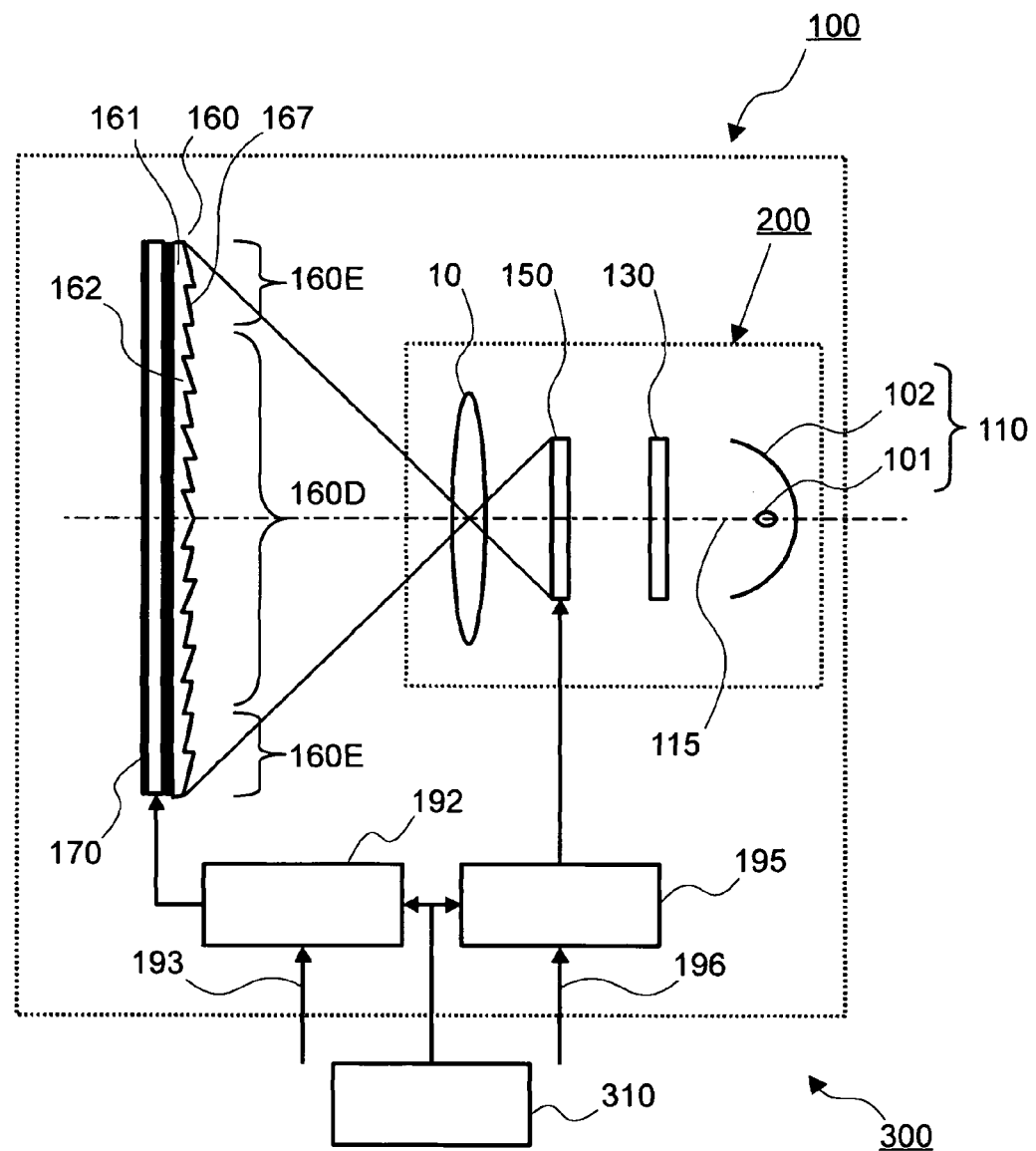
FIG. 1 is a structure view for showing an image displaying apparatus, according to an embodiment of the present invention.

FIG. 1 is a structure view for showing the image displaying apparatus, diagrammatically, according to an embodiment of the present invention. In an embodiment given below, explanation will be made on a case of applying a transmission-type liquid crystal panel as the second light modulator unit, as one example thereof. For obtaining a color image are necessary a color separation means, for separating a white color light into three primary colors, R, G and B, three (3) pieces of the liquid crystal panels corresponding to them, and further a composing prism, for composing the images of respective colors, which are formed on the liquid crystal panels, respectively; however, FIG. 1 shows each of the constituent elements, diagrammatically, neglecting the actual sizes thereof, and further omitting those mentioned above, for an easy understanding of the explanation.

In FIG. 1, the image displaying apparatus 100, according to the present embodiment, comprises an image display liquid crystal panel 170, as the first light modulator unit for forming the first image thereon, a projection image forming apparatus 200 for forming the second image, a Fresnel lens sheet 160, as a light direction conversion unit, which is disposed in vicinity of the light-incidence side of the image display liquid crystal panel 170, a first panel driver circuit 192 for driving the image display liquid crystal panel, so as to form the first image thereon, and a second panel driver circuit 195 for driving the projection image forming apparatus 200, so as to form the second image thereon.

However, depending upon the set configuration of the image displaying apparatus 100, there may be case where a light diffuser sheet is applied, in the place of the Fresnel lens sheet 160, for example.

The projection image forming apparatus 200 projects an enlarged image from a rear of the image display liquid crystal panel 170 (hereinafter, also called, simply "a liquid crystal panel"), for conducting the color display as the first light modulator unit to modulate a light (i.e., light modulation) corresponding to a first video signal 193, and thereby forming the second image in vicinity of the light-incidence side of the image display liquid crystal panel 170. Namely, the second display surface or screen 160a, which was explained by referring to FIGS. 16(a) and 16(b), is positioned in vicinity of the light-incidence side of the image display liquid crystal panel 170. And, the projection image forming apparatus 200 includes a light source 110 for emitting a light near to a white color, a polarized light converter element 130, functioning as a polarized light converter unit, for converting lights without polarization therein, which are emitted from the light source 110, to a component polarized into a desired direction, i.e., to align them, a liquid crystal panel 150, functioning as the second light modulator unit for forming the second original image thereon, through conducting the light modulation on the light (i.e., a white color light) from the polarized light converter element 130, and a projection lens apparatus or device 10, functioning as the enlarged image forming unit for forming the second image 155 on the second display surface or screen 160a in vicinity of the light-incidence side of the image display liquid crystal panel 170 (for example, in vicinity of a polarizing plate on the light-incidence side, but not shown in the figure), by enlargedly projecting a light flux light-modulated corresponding to the second video signal 196 on the liquid crystal panel 150 (i.e., the second original image), directing onto the image display liquid crystal panel 170, functioning as the first light modulator unit.

However, at the position of the display surface or screen of the second display surface or screen 160a, which is provided in vicinity of the light-incidence side of the image display liquid crystal panel 170, is provided the Fresnel lens sheet 160, functioning as the light direction converter unit for converting the light flux from the projection lens device 10, so that it is almost incident upon an incident surface of the image display liquid crystal panel 170, vertically. Due to this Fresnel lens sheet, the light flux from the projection lens device 10 is converted into a nearly parallel light flux, then only a light of angular component is incident upon, being superior in performance of the contrast for the panel for use of image display, and as a result thereof, the contrast performance as a total of the image displaying apparatus is increased, greatly. On the other hand, it is also possible to omit or remove the Fresnel lens sheet 160, for achieving the cost reduction thereof, but in this case, it is necessary to add a diffusion sheet having a large light diffusion effect, and therefore, such an effect mentioned above cannot be obtained, i.e., the effect of increasing the contrast performance, greatly.

The image display liquid crystal panel 170, functioning as the first light modulator unit, conducts the light modulation, again, upon the image light of a projection image (i.e., the second image 155) obtained by enlarging the second original image irradiated from the projection image forming apparatus 200, upon basis of the first video signal 193, through the first panel driver circuit 192, and thereby forming the first image 175 as a main display image, to be emitted from. Herein, it is assumed to be a TFT (Thin Film Transistor) type liquid crystal panel of active matrix drive, to be applied in a large screen direct-view type liquid crystal TV, having an aspect ratio 16:9, a pixel number 1,920×1,080, a screen size (a diagonal size L1 of an image display effective area) 27-60 inches, approximately. In general, the contrast ratio of the TFT-type liquid crystal panel is about 1,000:1, for example.

Further, the liquid crystal panel 150 functioning as the second light modulator unit, which is provided within the projection image forming apparatus 200, and also the image display liquid crystal panel 170, functioning as the first light modulator unit, have polarizing plates on both a light-incidence side and a light-emission side thereof, for the purpose of obtaining an image of high contrast thereon, but they are omitted from being shown in the figure. Also, when not taking the contrast performance into serious consideration thereof, since there may be a case where a desired performance can be obtained with omission of any one of the polarizing plates, therefore all the polarizing plates are not always needed. In this case, it is possible to achieve cost reduction by the material cost of the polarizing plate omitted. Further, within the projection image forming apparatus 200, according to the present invention, there is provided the polarized light converter unit for converting the lights without polarization, which are emitted from the light source 110, so as to align them, an efficiency of utilizing the lights is extremely high, comparing to that of the normal direct-view type liquid crystal TV.

The light source 110 includes a high intensity lamp 101, for emitting a nearly white color light therefrom, such as, a high-pressure mercury lamp, etc., for example, and a reflector 102 having a configuration of paraboloid of revolution, covering over the lamp 101 from the rear thereof, for reflecting the white color light from the lamp 101, so as to convert it into a parallel light. In the present embodiment, since the light emitted from the light source 110 is irradiated upon the liquid crystal panel, functioning as the second light modulator unit, which is fully small comparing to the image display liquid crystal panel 170, as will be mentioned later, therefore it is possible to apply a discharge lamp, such as, the high-pressure mercury lamp, etc.

The light emitted from the lamp 101 is reflected upon the reflector 102 having the configuration of paraboloid of revolution, for example, and it comes to be nearly parallel to an optical axis 115 thereof, i.e., a nearly parallel light flux is emitted from the light source 110. The light emitted from the light source 110 is incident upon the polarized light converter element 130.

The polarized light converter element 130 aligns the light without polarization, which is emitted from the light source 110, into a polarized light having a predetermined polarization direction. The light, coming into the predetermined polarized light through the polarized light converter element 130, is incident upon the liquid crystal panel 150.

The liquid crystal panel 150, functioning as the second light modulator unit, forms thereon an optical image (i.e., the second original image), by conducting the light modulation upon basis of the second video signal 196, through the second panel driver circuit 195. Herein, for reducing the price of the image displaying apparatus, in particular, when not taking the resolution into the serious consideration, there may be a case of applying a panel of low price much more, while lowering the resolution of the liquid crystal panel 150. For example, in case of a liquid crystal panel having an aspect ratio 16:9, a pixel number of HD 1,920×1,080, then it is possible to apply the pixel number 852×480 of WSVGA, with giving priority onto the cost thereof. On the other hand, as a screen size (i.e., the diagonal size L2 of the image display effective area), it is assumed to use a TN-type liquid crystal panel (i.e., a transmission-type liquid crystal panel) of single matrix drive, having 0.4 to 1.3 inches, approximately.

In general, a contrast ratio of the TN-type liquid crystal panel is around 700:1, i.e., being lower than that of TFT-type. However, according to the present invention, since the contrast ratio comes to be the product between the contrast ratio of the liquid crystal panel 150, as the second light modulator unit, and the contrast ratio of the image display liquid crystal panel 170, as the first light modulator unit, therefore there can be also obtained other effect of increasing the contrast ratio, remarkably, with using a low-price panel.

There may be a case where the second panel driver circuit 195 is so constructed to have a scaling function (not shown in the figure), in particular, when the resolution of the liquid crystal panel 150 as the second light modulator unit is low, comparing to that of the liquid crystal panel 170 as the first light modulator unit, for the purpose of cost reduction; thereby, conducting an image processing upon the second image signal 196, such as, the scaling or the like, for example, responding to the resolution of the liquid crystal panel. Thereafter, the second original image (i.e., an optical image) is formed through driving of the liquid crystal panel 150. Also, RGB signals to be supplied to the image display liquid crystal panel 170 may be supplied to the liquid crystal panel 150 (after conducting the scaling process thereon, responding to the resolution of the liquid crystal panel 150, depending on the necessity thereof).

The projection lens device 10, as the enlarged image forming unit, has structures of enlarging the image formed on the liquid crystal panel 150, and projecting it, directing to the image display liquid crystal panel 170, as the first light modular unit. In this instance, the size in depth of the image displaying apparatus comes to be large if applying the projection lens device of the conventional method. Then, according to the embodiment of the present invention, although the details thereof will be mentioned later, but an oblique projection is applied, for the purpose of making the size in depth as thin as possible.

The projection apparatus 10, according to the present invention, projects the image on the liquid crystal panel 150, enlargedly, upon the image display liquid crystal panel 170, as the first light modular unit, and therefore it must satisfy the following condition.

$$10 < L1/l2 < 150 \tag{Eq. 1}$$

The liquid crystal panel, as the second light modulator unit, the smallest one at the present, is about 0.48 inch (in the diagonal size thereof), then it can be considered that a limit thereof is about 0.4 inch. Then, the screen size of the liquid crystal panel 150 is L2=0.4, while the screen size of the image display liquid crystal panel 170 is L1=60, then L1/l2=150. If L1/l2 exceeds 150, then there is brought about a problem that the brightness irradiated upon the image display liquid crystal panel 170, as the first light modulator unit, comes to be dark. Therefore, it is preferable that L1/l2 is equal to or less than 150. With a lower limit thereof, though depending on the screen size of the liquid crystal panel 150, but it is preferable to be determined L1/l2, being equal to or greater than 10, at least, since it does not results into cost down if it is approached to the screen size of the image display liquid crystal panel 170. If applying a liquid crystal panel of the screen size L2=1.3 inch, near to the upper limit that can be applied within the general projection-type image display apparatus, as the liquid crystal panel 150, as the second light modulator unit, while determining the screen size of the image display liquid crystal panel 170, as the first light modulator unit, to L1=27 inches, then L1/l2=150, approximately, then it is possible to satisfy the condition mentioned above.

The Fresnel lens sheet 160 is an optical direction conversion unit, provided in vicinity of the position of the second display surface or screen 160a, for converting an oblique light from the projection device 10 such that it is incident upon the incident surface of the image display liquid crystal panel 170, almost vertically. Upon one surface of a material 161 building up the Fresnel sheet 160 (herein, a surface opposite to the side surface of the image display liquid crystal panel 170), there are formed a plural number of refraction type Fresnel lenses 162, for refracting the lights, being incident thereon at the incident angle within a predetermined value, thereby emitting, and also total-reflection type Fresnel lenses 167, for totally reflecting the lights, being incident thereon at the incident angle larger than that predetermined value, concentrically. And, the lights from the projection device 10 are refracted or totally reflected, upon the refraction type Fresnel lenses 162 or the total-reflection type Fresnel lenses 167, depending on the incident angle thereof, so that they are incident upon the incident surface of the image display liquid crystal panel 170, almost vertically (the details thereof will be mentioned later).

As was mentioned above, according to the present embodiment, the light is modulated (e.g., light modulation, or light intensity modulation) responding to the second video signal, with using the liquid crystal panel 150, being small in the sizes thereof, and the image obtained (e.g., the second original image) is projected, enlargedly, by means of the projection lens device 10, directing onto the image display liquid crystal panel 170, as the first light modulator unit, so as to form the second image 155 in vicinity of the light incidence side of the image display liquid crystal panel 170 (for example, in vicinity of the polarizing plate on the light incidence side), while the light modulation is conducted, again, upon the light flux incident upon the liquid crystal panel 170 mentioned above, responding to the second video signal (e.g., forming the first image), and therefore, it is possible to display two (2) pieces of images (e.g., the second image and the first image), at different positions in depth thereof, seeing from the observer, via the liquid crystal panel 170, not in time-sharing manner, but at the same time. However, it is insufficient only to display the plural number of the images, at different depth positions seeing from the observer, at the same time, for the purpose of obtaining the stereoscopy. Then, the 3-D display method, which is disclosed in the Patent Document 1 mentioned above, is applied therein. Thus, for example, the brightness of the 3-D substance is changed depending upon the depth position seeing from the observer 250, while keeping the total brightness seeing from the observer, at the constant. As an example, in more details thereof, with keeping the total brightness seeing from the observer, at the constant, the brightness is increased for the display surface or screen nearer to the observer (herein, the first display surface or screen 170a), on the other hand, it is lowered down for the display surface or screen farther from the observer (herein, the second display surface or screen 155a).

In case when applying the image displaying apparatus 100, for executing such control as mentioned above, in particular, into the 3-D image displaying apparatus 300, then the 3-D image displaying apparatus 300 must have a controller circuit 310, in addition to the image displaying apparatus 100.

The controller circuit 310 controls, so that a difference in brightness is generated between the first image and the second image, for the first panel driver circuit 192 of driving the mage display liquid crystal panel 170, as the first light modulator unit, and also the second panel driver circuit 195 of driving the liquid crystal panel 150, as the second light modulator unit. For example, the brightness is controlled to increase for the first panel driver circuit 192, while decrease for the second panel driver circuit 195. Of course, only the brightness may be lowered for the second panel driver circuit 195, simply.

Of course, the controller circuits should not be restricted to that. For example, as is shown in FIG. 17, the 3-D image displaying apparatus 300A may have such a controller circuit 310A, in the place of the controller circuit, that the controller circuit 310A, inputting the video signal 191 so as to conduct a predetermined process thereon, produces the first video signal (for use of the first light modulation) and the second video signal (for use of the second light modulation), thereby to supply a first video signal 193' produced and a second video signal 196' produced to the first panel driver circuit 192 and the second panel driver circuit 195, respectively.

However, the 3-D display method should not be restricted only to that mentioned above, but it is apparent that, any one of the various method can be applied for controlling the brightness, which are shown in the Patent Document 1.

Herein, explanation will be made a little bit on features, which is owned by the image displaying apparatus 100, according to the present embodiment, but other than those mentioned above.

In the image displaying apparatus 100, according to the present embodiment, as was mentioned above, since the contrast ratio of the image comes to be the product between the contrast ratio of the liquid crystal panel 150 and the contrast ratio of the mage display liquid crystal panel 170, therefore it is possible to increase the contrast ratio, remarkably.

On the other hand, it is possible to apply the liquid crystal panel 150, being sufficiently small comparing to the image display liquid crystal panel 170, as the first light modulator unit, and in addition thereto, it is also possible to reduce the size of the light source 110. Accordingly, comparing to the conventional technology of using the light source (i.e., a back light) therein, i.e., being built up with an expensive liquid crystal panel same in the size to the image display liquid crystal panel 170, and disposing a plural number of LEDs in parallel with, it is possible to reduce the cost of the lighting apparatus down to ⅔ to ½, since there can be applied a liquid crystal panel of low resolution, in spite of addition of the projection device and/or the Fresnel lenses.

Also, applying a method of for brining the liquid panel 150 together with a synthesizing prism (not shown in the figure) into a block, to be exchangeable with the light source 110, respectively, enables to increase the capability of services.

Also, differing from the direct-view type liquid crystal image displaying apparatus, there is no necessity of providing the light source (normally, a cathode ray tube or LED), i.e., also a heat source, in vicinity of the image display liquid crystal panel 170, and therefore designing is easy for the cooling structures thereof.

Though no mentioning was made about the details thereof in the above, but it is possible to correspond one (1) pixel of the liquid crystal panel 150, as the second light modular unit, to a plural number of pixels of the image display liquid crystal panel 170, as the first light modulator unit, or on the contrary, to correspond a plural number of pixels of the liquid crystal panel 150 to one (1) pixel of the image display liquid crystal panel 170, but the present invention should not be restricted only to this. It is needless to say that one (1) pixel of the liquid crystal panel 150 corresponds to one (1) pixel of the image display liquid crystal panel 170 (i.e., one (1) pixel includes a set of R-pixel, G-pixel, and B-pixel).

Also, though applying the high-pressure mercury lamp therein, however there may be applied a LED or a laser device of white color light. In case where an amount of the light is short with such one piece of the LED or a laser light, there may be applied one of arranging a plural number of LEDs or laser devices.

Also, though applying the transmission type liquid crystal panel as the second light modulation unit for use of light modulation of the light flux from the light source responding to the second video signal, but in the place thereof, it is also possible to apply a reflection type light modulation element, such as, a liquid crystal panel (LCOS: Liquid Crystal on Silicon), or a minute mirror element (DMD: Digital Micro Mirror Device), etc., for example.

Next, explanation will be made on an embodiment of the projection device. Herein, for the purpose of bringing the depth size of the image display apparatus as thin as possible, there is applied a projection lens device, which is described in Japanese Patent Laying-Open No. 2006-292900 (2006) filed by the present inventors.

Figure 4:
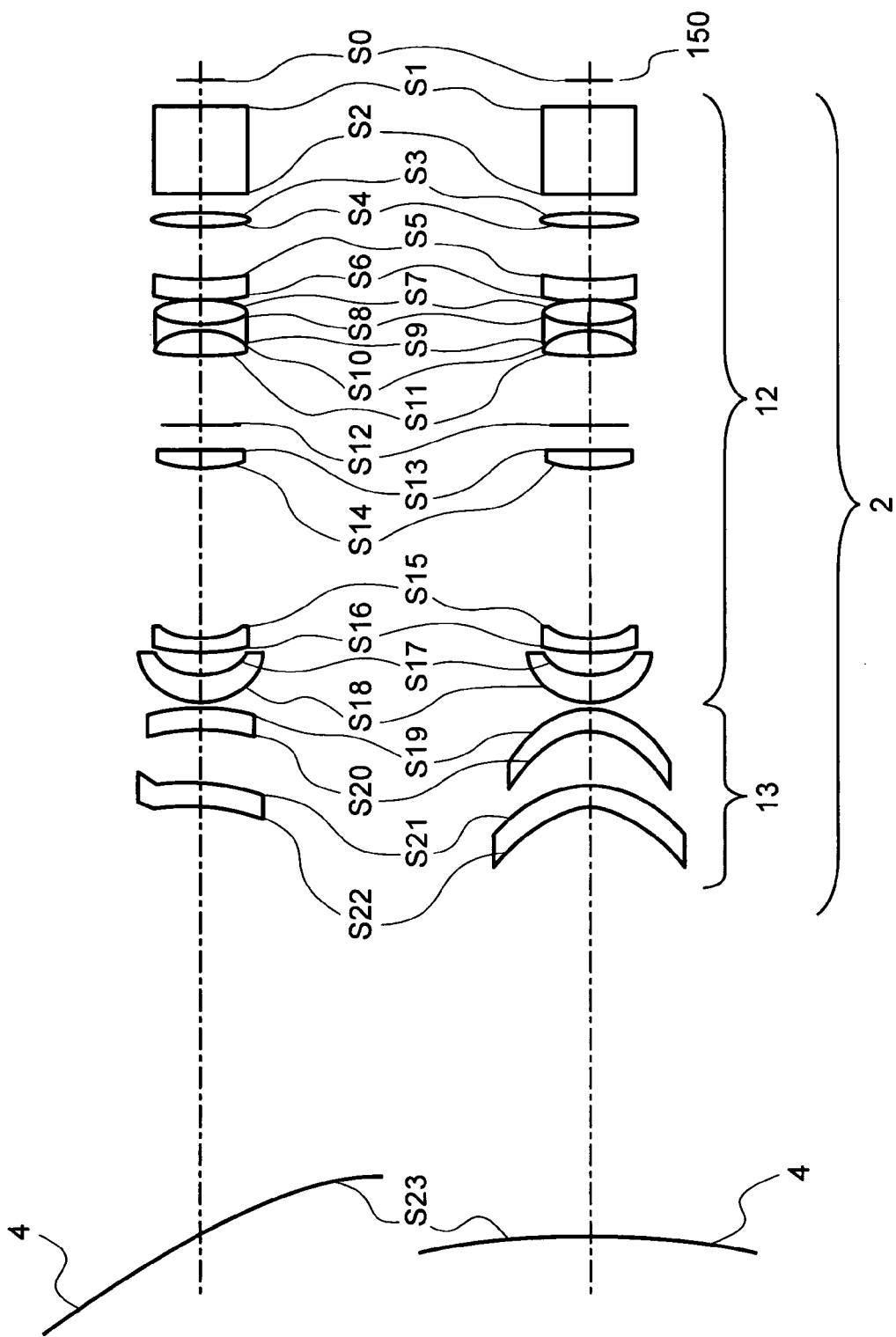
FIG. 4 is a cross-section view of the projection lenses, in the vertical direction and the horizontal direction.

FIG. 2 is a cress-section view for showing the structures of a basis or fundamental optic system of the projection device within the image display apparatus, wherein the structures of the optic system are shown on a YZ cross-section within XYX orthogonal coordinate systems. Herein, it is assumed that the origin or start point of the XYX orthogonal coordinate systems is at a center of the display screen of the liquid crystal panel 150, and the Z-axis thereof is in parallel with a normal line 8 of the image display liquid crystal panel 170. And, it is also assumed that the Y-axis thereof is in parallel with a short side of the display screen of the image display liquid crystal panel 170, and that it is equal to the image display liquid crystal panel 170 in the vertical direction thereof. Further, it is assumed that the X-axis thereof is in parallel with a longitudinal side of the display screen of the image display liquid crystal panel 170, and that it is equal to the image display liquid crystal panel 170 in the horizontal direction thereof. Also, FIG. 3 is a perspective view of projection lenses building up the projection device, and FIG. 4 is a cress-section view of the projection lenses, but omitting the illustration of bending of the optical path therein. However, FIG. 2 omits to shown the Fresnel lens sheet 160 therein, as the optical direction conversion part, for the purpose of simplifying the illustration.

As is shown in FIG. 2, the projection unit 10 includes projection lenses 2, a freely curved surface mirror 4 as a first reflection mirror, and a plane reflection mirror 5 as a second reflection mirror, which are disposed or aligned on an optical path, directing from the liquid crystal panel 150 toward the Fresnel lens sheet 160 and the image display liquid crystal panel 170, sequentially from the liquid crystal panel 150.

The second original image upon the display screen of the liquid crystal panel 150 is projected toward the image display liquid crystal panel 170 as the first light modulator unit, by means of the projection lenses 2. In this instance, if projecting it, straightly, there is a necessity of a predetermined distance, and this elongates the depth size of the image display apparatus. Thus, the depth of the image display apparatus 100 comes to be thick. Then, the optical paths (i.e., the optical paths indicated by the light beams 21, 22 and 23), directing from the projection lenses 2 toward the image display liquid crystal panel 170, are bent upon the freely curved surface lens 4 and the plane reflection mirror 5, thereby reducing the depth of the image display apparatus to be small. Further, the light beam 21, emitting from a center of the screen of the liquid crystal panel 150 and directing to a center of the image display liquid crystal panel 170 (hereinafter, being called a "screen central light beam"), is non-vertical to the incident surface of the image display liquid crystal panel 170 (in general, such the projection is called an "oblique projection"), thereby reducing the depth of the image display apparatus.

The projection lenses 2, as apparent from FIGS. 2 and 4, are made up with a front group 12, including a plural number of refractive lenses, each having a rotationally symmetric surface configuration, and a rear group 13, including a lens, at least one of surfaces thereof having a freely curved surface configuration, being rotationally asymmetric (hereinafter, being called "freely curved surface lens").

In FIG. 2, since length of the projection lens 2 is long, then it seems that the position of the liquid crystal panel 150 is far from, to the direction of the normal line 8 of the image display liquid crystal panel 170, and that the depth becomes thick. However, herein, as is shown in FIG. 3, a mirror 14 for bending an optical path is positioned on the way of the front group 12 that is disposed in parallel with the X-axis (i.e., a longitudinal side of the image display liquid crystal panel), and thereby bending an optical axis 9 of the front group 12 (i.e., the optical axis of the projection lenses) into the direction of Z-axis (i.e., into the direction parallel with the normal line 8 of the image display liquid crystal panel 170), so as to prevent the depth thereof from being increased. Of course, the present invention should not be limited to this, and the mirror for bending the optical path may be also disposed between the freely curved surface mirror 4 and the rear group of the projection lenses 2, or between the front group 12 and the rear group 13 of the projection lenses 2.

In the present embodiment, as is shown in FIG. 2, the liquid crystal panel 150 is disposed, with locating the center of the display screen thereof on the optical axis 9 of the projection lenses 2. Accordingly, the screen central light beam 21 emitting from the center of the display screen of the liquid crystal panel 150, passing through an incident pupil of the projection lenses 2, and directing to the screen center of the image display liquid crystal panel 170, propagates along with the optical path of the projection lenses. This screen central light beam 21, after being reflected at a point P2 upon the reflection surface of the freely curved surface mirror 4, is reflected at a point P5 on the plane reflection mirror 5, and it is incident at a point P8 upon the incident surface of the image display liquid crystal panel 170, by a predetermined angle (θs) with respect to the normal line 8 of the incident surface of that image display liquid crystal panel (i.e., obliquely).

This means that the light beam passing through, along with the optical axis 9 of the projection lenses 2, is incident, obliquely, with respect to the image display liquid crystal panel 170, and also means that the optical axis of the projection lenses 2 is substantially provided inclining to the image display liquid crystal panel 170. When making the light incident upon the image display liquid crystal panel 170, in this manner, then there are generated various kinds of aberrations, not being rotationally symmetric to the optical axis, other than the so-called trapezoidal distortion, i.e., bringing the rectangular shape projected into the trapezoidal one. Then, according to the present embodiment, those are compensated by means of the rear group 13 of the projection lenses 2 and also the reflection surface of the freely curved surface mirror 4.

Within the cross-section shown in FIG. 2, the light beam being emitted, passing through the center of the incident pupil of the projection lenses 2, from a lower end of the screen of the liquid crystal panel 150, and being incident at a point P9 upon an upper end of the screen of the image display liquid crystal panel 170, corresponding to this, it is assumed to be a light beam 22. Also, the light beam being emitted, passing through the center of the incident pupil of the projection lenses 2, from an upper end of the screen of the liquid crystal panel 150, and being incident at a point P7 upon a lower end on the screen of the image display liquid crystal panel 170, corresponding to this, it is assumed to be a light beam 23. When seeing FIG. 2, an optical path length starting from the point P3 via the point P6 and reaching to the point P9 is longer the optical path length starting from the point P1 via the point P4 and reaching to the point P7. This means that the image point P9 on the image display liquid crystal panel 170 is far from the image point P7, seeing them from the projection lenses 2. Then, if an object point corresponding to an image point on the image display liquid crystal panel 170 (i.e., a point on the display screen of the liquid crystal panel 150) is at a point nearer to the projection lenses 2, and also if an object point corresponding to the image point P7 is at the position farther from the projection lenses 2, it is possible to compensate the inclination of the image surface. For that purpose, a normal-line vector at the center of the display screen on the liquid crystal panel 150 is inclined with respect to the optical axis of the projection lenses 2. In more details, it is enough to incline the normal-line vector mentioned above into the direction where the image display liquid crystal panel 170 is located, within the YZ plane. The method is already known for inclining the object plane in order to obtain the object plane inclining with respect to the optical axis. However, with the practical angle of field, since the image surface upon inclination of the object plane generates deformation asymmetric with respect to the optical axis, and it is difficult to compensate it, by means of the projection lenses, being rotationally symmetric. Then, according to the present embodiment, the asymmetric deformation on the image surface is dealt with, by using the freely curved surface, being rotationally asymmetric, i.e., being rotationally asymmetric. For this reason, it is possible to reduce a low dimension distortion on the image surface, greatly, by inclining the object surface, and this is effective for assisting the compensation of aberrations.

Next, explanation will be given on a function of each of optical elements. In the projection lenses 2, the front group 12 is made of the main lenses, for projecting the second original image on the liquid crystal panel 150 as the second light modulator unit (i.e., a 2-D image obtained through light modulation) onto the image display liquid crystal panel 170 as the first light modulator unit (saying this more correctly, for forming an image in vicinity of the light incidence side of the image display liquid crystal panel 170, for example, in the vicinity of a polarizing plate (not shown in the figure) on the light incidence side thereof), and it compensates the fundamental or basic aberrations on the rotationally symmetric optic system. The rear group 13 of the projection lenses 2 includes the freely curved surface lens, being rotationally asymmetric. Herein, as is apparent from FIGS. 2, 3 and 4, the freely curved surface lens is curved, directing the concave portion thereof into the direction of emission of the light. And, curvature of the freely curved surface lens, in particular, of a portion where the light beam 23 passes through directing to the lower end of the image display liquid crystal panel 170, is larger than that of a portion where the light beam 22 passes through directing to the upper end of the image display liquid crystal panel 170.

The freely curved surface mirror 4 has a reflection surface of freely curved surface configuration, being rotationally asymmetric. Herein, the freely curved surface mirror 4 is made from a convex surface mirror, being rotationally asymmetric, where a portion thereof is curved, so as to direct the convex with respect to the direction of light reflection thereon. In more details, the curvature of a portion (P1) for reflecting the light directing below onto the image display liquid crystal panel 170 is larger than that of a portion (P3) for reflecting the light directing upper onto the image display liquid crystal panel 170. In other words, on the YZ cross-section of the freely curved surface mirror 4 (i.e., on the cross-section in the direction vertical to the screen of the image display liquid crystal panel 170) the size between P1 and P2 and the size between P3 to P2 are made different from, with respect to the position P2 where the screen center light beam 21 is reflected upon, so that the following equation can be established:

$$\text{size between } P1 \text{ and } P2 < \text{size between } P3 \text{ to } P2 \quad (\text{Eq. 2})$$

And, it is also possible the portion (P1) for reflecting the light directing below onto the image display liquid crystal panel 170 has a configuration, being convex into the direction of reflection of that light, while the portion (P3) for reflecting the light directing upper onto the image display liquid crystal panel 170 has a configuration, being concave into the direction of reflection of that light.

The aberration generated due to the oblique incidence is compensated, mainly, with the functions of the freely curved surface lens and the freely curved surface mirror, which are mentioned above. Thus, according to the present embodiment, the freely curved surface mirror 4 mainly compensates the trapezoidal distortion, and the rear group of the projection lenses 2 mainly compensates the asymmetric aberration, such as, the distortion on the image surface, etc.

In this manner, according to the present embodiment, the projection lenses include therein, at least one (1) piece of the freely curved surface lens, being rotationally asymmetric, and the freely curved surface mirror 4 defines the reflection mirror of freely curved surface configuration, being rotationally asymmetric. This enables to compensate both the trapezoidal distortion and the aberration, which are generated due to the oblique projection. As a result of this, the second original image, which is light-modulated on the liquid crystal panel 150 upon basis of the second video signal, is enlarged and projected onto the image display liquid crystal panel, and it is light-modulated, again, upon basis of the first video signal by means of the image display liquid crystal panel, with applying this image light flux as a pseudo secondary light source. From the observer side, it is possible to observe two (2) pieces of images, different in the position in depth, i.e., the second image 155 and the first image 175, not in time-sharing manner, but at the same time.

Further, as those two (2) pieces of images (e.g., the second image and the first image) applying the 2-D images obtained by projecting the display object from the visual axis direction of the observer, it is possible to achieve the 3-D image displaying apparatus for enabling to display the 3-D image; i.e., producing the 2-D image, on the depth side seeing from the observer between those, with applying the enlarged image (e.g., the projection image) on the liquid crystal panel 150 as the second light modulator unit, while display the other 2-D image, on the front side seeing from the observer, on the image display liquid crystal panel 170 as the first light modulator unit mentioned above (for example, see the explanation of FIG. 16). In this instance, for the purpose of improving the definition of the 3-D image by increasing the information volume in the depth direction of the image, it is needless to say that it is enough to increase a number of display images of the projection images (e.g., the 2-D images), as the second image mentioned above.

Next, explanation will be made on the optic system of the projection lens device 10, which was mentioned above, by referring to FIGS. 5 and 6 and Tables 1 to 4, as well, as showing the detailed numerical values thereof.

Figure 5:
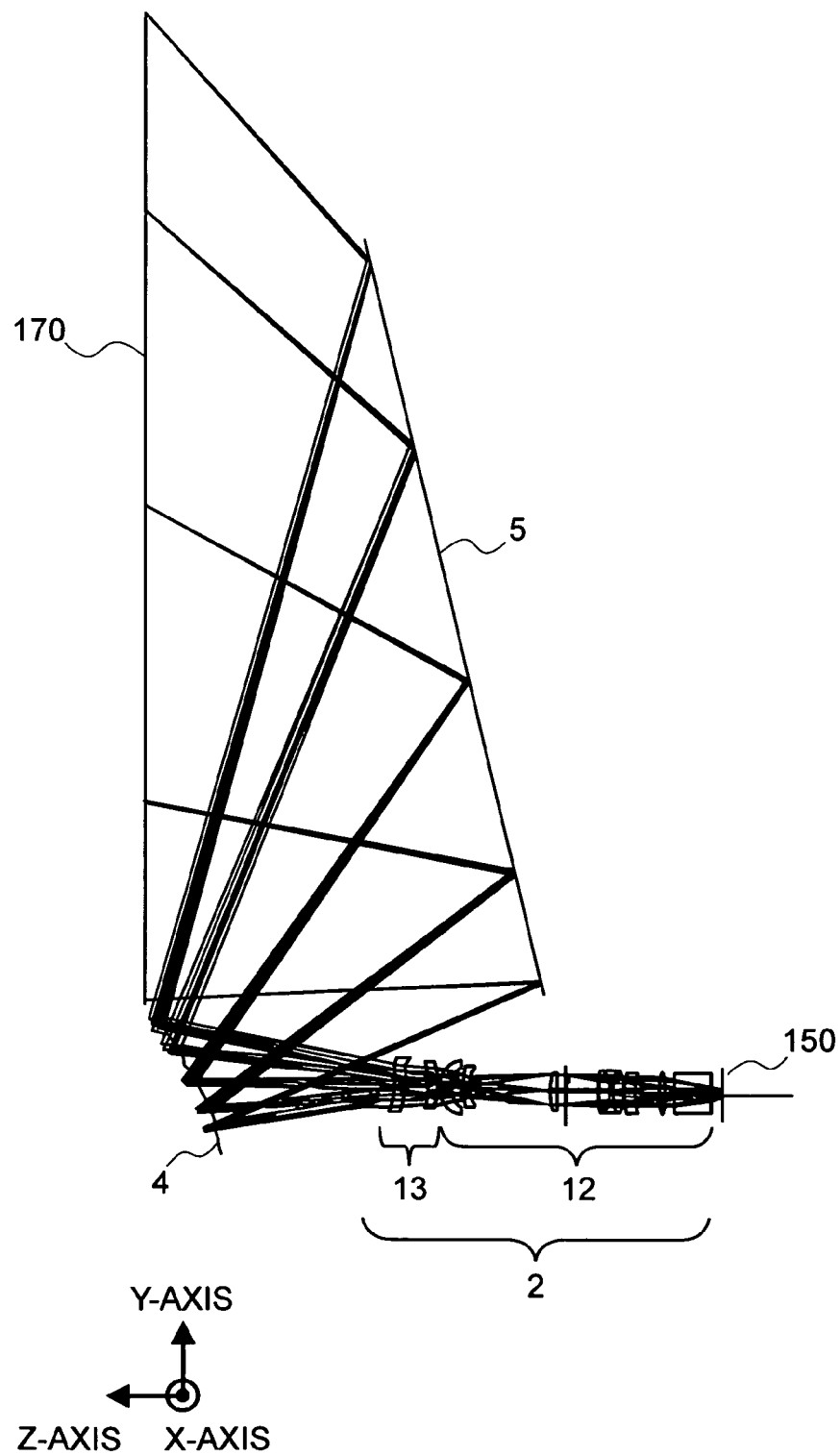
FIG. 5 is a view for showing light beams within an projection optical system, according to the present embodiment, in particular, on a YZ cross-section thereof.
Figure 6:
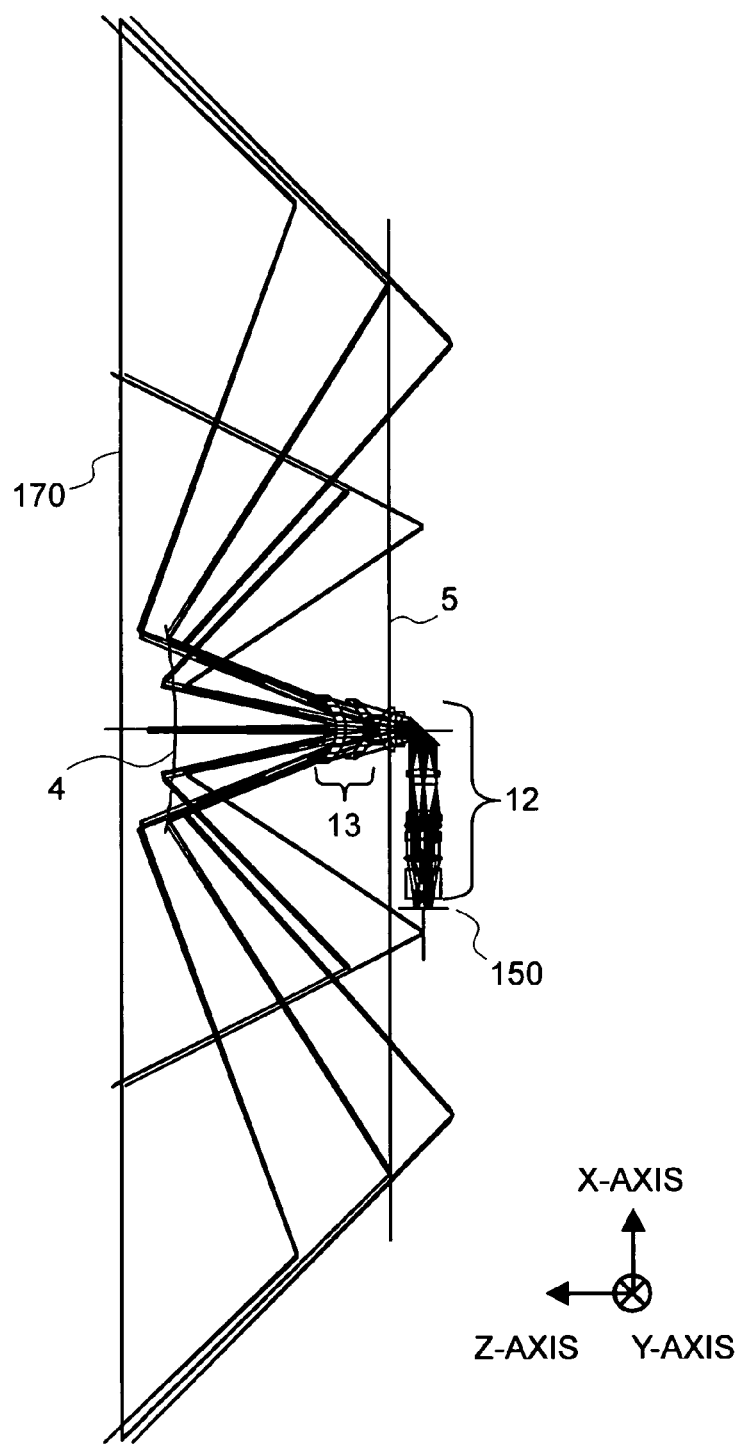
FIG. 6 is a view for showing light beams within the projection optical system, according to the present embodiment, in particular, on a XZ cross-section thereof.

FIGS. 5 and 6 show the diagram of light beams of the optic system of the projection device, according to the present embodiment, upon the numerical examples thereof. In the orthogonal XYZ coordinate systems mentioned above, FIG. 5 shows the structures thereof on the YZ cross-section, and FIG. 6 those on the XZ cross-section. Within the projection lenses 2, the optical path-bending mirror 14 is disposed on the way of the front group 12, as was mentioned in FIG. 3, but in FIG. 5 is omitted this optical path-bending mirror 14 from being shown therein, and the optic system is extended in the direction of Z-axis. This is also same in FIG. 4. The optical path-bending mirror has a little voluntariness in the position and/or the angle in setting thereof, and it gives no ill influence upon the function of each optical element. Therefore, explanation will be made, while omitting that of the optical path-bending mirror, in the explanation that will be given below.

The light emitting from the liquid crystal panel 150 shown below in FIG. 5 passes through, firstly the front group 12 that is constructed with only the lenses having the rotationally symmetric configuration, among the projection lenses 2 including the plural number of lenses therein. And, it passes through the rear group 13 including the freely curved surface lens therein, and is reflected upon the reflection surface of the freely curved surface mirror 4. The reflection light thereupon, after being reflected upon the plane reflection mirror 5, is incident upon the image display liquid crystal panel 170.

Herein, the front group 12 is built up with the plural number of lenses, all of which have a refracting surface of rotationally symmetric configuration, and four (4) of the refracting surfaces of those lenses have aspheric surfaces, each being rotationally symmetric, and others have the spherical surfaces. The aspheric surface being rotationally symmetric, which is used therein, can be expressed by the following equation (Eq. 3), with using a local cylindrical coordinates system for each surface:

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

Where, "r" is the distance from an optic axis, and "Z" represents an amount of sag. Also, "c" is the curvature at an apex, "k" a conical constant, "A" to "J" coefficients of a term of power of "r".

The free curved surfaces in the rear group 13 of the projection lenses 2 can be expressed by the following equation (Eq. 4), including polynomials of X and Y, with applying the local coordinates system (x, y, z) assuming the apex on each surface to be the origin.

$$Z = \frac{cr^2}{1+\sqrt{1-(1+k)c^2r^2}} + \sum_m \cdot \sum_n (C(m,n) \cdot x^m \cdot y^n)$$

Where, "Z" represents an amount of sag of the free curved surface configuration, in particular, into the direction perpendicular to X- and Y-axes, "c" the curvature at the apex, "r" the distance from the origin within a plane of X- and Y-axes, "k" the conical constant, and C(m,n) the coefficients of the polynomials.

The Table 1 shows the numerical data of the optic system, according to the embodiment 1. In this Table 1, S0 to S23 correspond to the marks S0 to S23 shown in FIG. 4 mentioned above, respectively. Herein, the mark S0 shows the display surface of the image display element 150, i.e., the object surface, and S23 the reflection surface of the freely curved surface mirror 4. Also, though not shown in FIG. 4, but a mark S24 shows an incident surface of the image display liquid crystal panel 170, i.e., the image surface. However, in FIG. 4, an upper view shows the YZ cross-section of the projection lenses 2 and the freely curved surface mirror 4, according to the present embodiment, and a lower view the XZ cross-section of that optic system.

In the Table 1 mentioned above, "Rd" is the radius of curvature for each surface, and it is presented by a positive value in case when having a center of curvature on the left-hand side of the surface in FIG. 5, while by a negative value in case when having it on the right-hand side, contrary to the above. Also, "TH" is the distance between the surfaces, i.e., presenting the distance from the apex of the lens surface to the apex of the next lens surface. The distance between the surfaces is presented by a positive value in case when the next lens surface is at the left-hand side, in FIG. 5, while by a negative value in case when it is at the right-hand side, with respect to that lens surface. Further, in the Table 1, S5, S6, S17 and S18 are aspheric surfaces, being rotationally symmetric, and also in this Table 1, they are attached with "*" beside the surface numbers for easy understanding thereof, wherein coefficients of the aspheric surface of those four (4) surfaces are shown in the Table 2 below.

S19 to S22 in the Table 1 are the refraction surfaces, each having the free curved surface configuration, which builds up the rear lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the Table 3 below.

According to the present embodiment, the object surface, i.e., the display screen of the image display element 11 is inclined by −1.163 degrees to the optical axis of the projection lenses 2. The direction of inclination, it is assumed, be presented by a positive value, into which the normal line on the object surface rotates into the clockwise direction, within the cross-section shown in FIG. 5. Accordingly, according to the present embodiment, it means that, within the cross-section shown in FIG. 5, the object surface is inclined into the anti-clockwise direction by 1.163 degrees from the position, perpendicular to the optical axis of the lens optic system.

The free curved surface mirror 4 of the mark S23 is so disposed that the origin of that local coordinates locates on the optical axis of the projection lenses 2. And, the normal line at the origin of that local coordinates, i.e., the Z-axis, is disposed, inclining by around +29 degree from the position parallel to the optical axis of the projection lenses 2. The direction of this inclination is assumed to be positive in the anti-clockwise rotating direction, within the cross-sections shown in FIG. 5, and therefore, it is inclined into the anti-clockwise rotation. With this, the screen central light beam, emitting from the screen center of the liquid crystal panel 150 and propagating almost along with the optical axis of the projection lenses 2, after being reflected upon S23, propagates into a direction inclined by 58 degrees, i.e., 2 times large as the inclination angle with respect to the optical axis of the projection lenses 2. Herein, it is assumed that a new optical axis after the reflection directs into the direction passing through S23, i.e., the origin of the coordinates, and inclining 2 times large as the inclination angle with respect to the optical axis of the projection lenses 2, and that the surfaces thereafter are disposed on this optical axis. The value −400 of the distance shown by S23 in the Table 1 indicates that the following S24 lies at the right-hand side of S23, and the origin of the local coordinates is located at the point of distance 400 mm along the optical axis after the reflection. The surfaces thereafter are also disposed in accordance with the same rules.

The conditions of the inclination and an offsets in the local coordinates are shown in the Table 4 below, for each surface. In this Table 4, values of the inclination angle and the offset are shown on the columns on the right-hand sides of the surface number, wherein "ADE" is a magnitude of the inclination within the surface in parallel with the cross-section shown in FIG. 5, and a rule of display thereof is as shown in the above. Also, "YDE" is a magnitude of the offset, and the offset is set up into the direction perpendicular to the optical axis within the surface in parallel with the cross-section of FIG. 5, and the offset below on the cross-section of FIG. 5 is assumed to be positive. However, in the present embodiment, "YDE" is set to be "0" (i.e., no offset).

In the present invention, the inclinations and the offsets of all optical elements are determined in the directions within the cross-section parallel with the cross-section shown in the figure.

From the Tables 1 and 3 mentioned above, according to the present embodiment, it is apparent that the curvature "c" and the conic coefficients "k" are "0". The trapezoidal distortion due to the oblique incidence is generated, extremely large in the direction of the oblique incidence, but the amount thereof is small in the direction perpendicular to this. Accordingly, in the direction of the oblique incidence and the direction perpendicular thereto, there must be provided functions greatly different from each other, and it is possible to compensate or correct the asymmetric aberration, preferably, without using the curvature "c" or the conic coefficient "k", being rotationally symmetric and functioning in all directions.

TABLE 1

| Surface | Rd | TH | nd | νd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4* | −84.858 | 18.00 | | |
| S5* | −83.708 | 9.00 | 1.49245 | 42.9 |
| S6* | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |

TABLE 1-continued

| Surface | Rd | TH | nd | νd |
|---|---|---|---|---|
| S14 | −53.869 | 65.00 | | |
| S15 | −24.898 | 4.19 | 1.74702 | 33.2 |
| S16 | −58.225 | 9.00 | | |
| S17* | −27.332 | 10.00 | 1.49245 | 42.9 |
| S18* | −32.424 | 2.50 | | |
| S19# | Infinity | 8.00 | 1.49245 | 42.9 |
| S20# | Infinity | 20.51 | | |
| S21# | Infinity | 8.00 | 1.49245 | 42.9 |
| S22# | Infinity | 160.99 | | |
| S23# | Infinity | −400.00 | REFL | |
| S24 | Infinity | 305.00 | REFL | |
| S25 | Infinity | — | | |

TABLE 2

| Surface | Aspheric Surface Coefficients | | | | | | | | |
|---|---|---|---|---|---|---|---|---|---|
| S5 | K | −11.7678542 | C | −1.159E−11 | F | 2.298642E−20 | J | −1.255E−26 |
| | A | −2.7881E−06 | D | −3.2834E−14 | G | 1.05201E−21 | | |
| | B | 9.67791E−09 | E | 1.09359E−16 | H | 1.96001E−24 | | |
| S6 | K | −5.4064901 | C | 2.0324E−12 | F | 3.0211E−19 | J | −1.4982E−26 |
| | A | 6.14967E−07 | D | −2.2078E−14 | G | 4.30049E−22 | | |
| | B | 4.60362E−09 | E | −8.0538E−17 | H | 4.79618E−24 | | |
| S17 | K | 1.106429122 | C | −9.0262E−11 | F | −1.0521E−18 | J | −6.0837E−26 |
| | A | −1.1068E−05 | D | −1.3984E−13 | G | −8.1239E−23 | | |
| | B | 7.21301E−08 | E | 3.1153E−16 | H | 3.86174E−23 | | |
| S18 | K | 0.742867686 | C | −2.2719E−11 | F | 1.09398E−19 | J | 9.02232E−29 |
| | A | 1.51788E−07 | D | −4.6853E−14 | G | 1.62146E−22 | | |
| | B | 2.10472E−08 | E | 2.9666E−17 | H | −3.0801E−25 | | |

TABLE 3

| Surface | Aspheric Surface Coefficients | | | | | | |
|---|---|---|---|---|---|---|---|
| S19 | | | C17 | 5.38933E−07 | C34 | −1.2381E−09 | C51 | −7.4126E−14 |
| | K | 0 | C19 | 8.33432E−07 | C36 | 1.13944E−09 | C53 | 2.05074E−12 |
| | C4 | 0.013500584 | C21 | −4.6367E−08 | C37 | 3.87771E−12 | C55 | −9.2166E−13 |
| | C6 | 0.003493312 | C22 | −6.2643E−09 | C39 | 1.04779E−11 | C56 | −2.5867E−15 |
| | C8 | −0.00083921 | C24 | −2.2449E−08 | C41 | 1.80038E−11 | C58 | −8.7122E−15 |
| | C10 | −0.00032098 | C26 | −5.6706E−08 | C43 | 5.23019E−11 | C60 | 2.85321E−14 |
| | C11 | 8.59459E−06 | C28 | 9.69952E−10 | C45 | 1.69253E−11 | C62 | −8.5084E−14 |
| | C13 | 2.14814E−06 | C30 | −1.1968E−10 | C47 | −2.7E−14 | C64 | 1.25198E−13 |
| | C15 | 7.54355E−06 | C32 | −1.3638E−09 | C49 | 7.30978E−13 | C66 | −5.6277E−14 |
| S20 | | | C17 | 7.49262E−07 | C34 | −5.7462E−10 | C51 | −3.6141E−13 |
| | K | 0 | C19 | 1.19039E−06 | C36 | 1.27396E−09 | C53 | 8.54188E−14 |
| | C4 | 0.015488689 | C21 | −1.2953E−07 | C37 | −4.7746E−12 | C55 | −5.3469E−13 |
| | C6 | 0.006553414 | C22 | 5.115E−10 | C39 | 7.32855E−12 | C56 | 8.92545E−17 |
| | C8 | −0.00116756 | C24 | −2.1936E−08 | C41 | 5.30157E−11 | C58 | −5.3434E−15 |
| | C10 | −0.00033579 | C26 | −5.9543E−08 | C43 | 5.05014E−11 | C60 | 1.96533E−14 |
| | C11 | 7.5015E−06 | C28 | 2.03972E−08 | C45 | −2.1894E−11 | C62 | −1.3923E−13 |
| | C13 | −2.5728E−06 | C30 | 1.16701E−11 | C47 | −1.2515E−13 | C64 | 1.06322E−13 |
| | C15 | −1.3543E−06 | C32 | −1.6198E−09 | C49 | 7.64489E−13 | C66 | −4.6602E−15 |
| S21 | | | C17 | −1.0379E−07 | C34 | 2.81743E−10 | C51 | −8.1775E−15 |
| | K | 0 | C19 | 3.0082E−08 | C36 | 6.05663E−10 | C53 | 3.06022E−14 |
| | C4 | 0.015096874 | C21 | 7.95521E−08 | C37 | 8.39381E−13 | C55 | −9.1775E−13 |
| | C6 | 0.009982808 | C22 | −1.3911E−09 | C39 | 1.98531E−12 | C56 | −7.8543E−17 |
| | C8 | 0.000358347 | C24 | 9.33292E−10 | C41 | 1.37477E−11 | C58 | −8.9588E−16 |
| | C10 | 0.000209267 | C26 | 3.54468E−09 | C43 | −1.0671E−11 | C60 | −6.0768E−15 |
| | C11 | −3.8593E−07 | C28 | 4.1615E−09 | C45 | 9.04109E−12 | C62 | −1.9528E−14 |
| | C13 | −6.8336E−06 | C30 | −1.2331E−11 | C47 | 2.48401E−14 | C64 | 2.6781E−14 |
| | C15 | −2.2455E−05 | C32 | −2.3367E−10 | C49 | 6.92603E−14 | C66 | −1.4324E−14 |
| S22 | | | C17 | −3.6973E−07 | C34 | 4.8045E−10 | C51 | −2.9795E−13 |
| | K | 0 | C19 | −3.0682E−07 | C36 | 1.43328E−10 | C53 | −2.5306E−14 |
| | C4 | 0.022813527 | C21 | 4.12093E−08 | C37 | −2.0707E−12 | C55 | −3.9401E−13 |
| | C6 | 0.012060543 | C22 | 4.07969E−09 | C39 | −4.9221E−12 | C56 | 6.88651E−16 |
| | C8 | 0.000638931 | C24 | 8.5986E−09 | C41 | −2.3681E−11 | C58 | 1.55006E−15 |
| | C10 | 0.000196027 | C26 | 2.1713E−08 | C43 | −2.1567E−11 | C60 | −1.4674E−15 |
| | C11 | −7.1204E−06 | C28 | 1.63499E−08 | C45 | −2.3679E−12 | C62 | −9.9822E−15 |
| | C13 | −1.269E−05 | C30 | 1.38704E−10 | C47 | −5.7167E−15 | C64 | 2.72925E−14 |
| | C15 | −2.5184E−05 | C32 | 2.02372E−10 | C49 | −9.0337E−14 | C66 | −1.1966E−14 |

TABLE 3-continued

| Surface | | | | Aspheric Surface Coefficients | | | | |
|---|---|---|---|---|---|---|---|---|
| S23 | | | C17 | −1.1083E−09 | C34 | −4.9118E−14 | C51 | −5.4918E−19 |
| | K | 0 | C19 | −5.7768E−10 | C36 | 8.12546E−14 | C53 | −2.2569E−18 |
| | C4 | 0.001597194 | C21 | 1.60076E−10 | C37 | −7.486E−17 | C55 | −3.5657E−18 |
| | C6 | 0.001324181 | C22 | 1.91534E−12 | C39 | 6.80626E−16 | C56 | 1.09883E−21 |
| | C8 | 1.37885E−05 | C24 | −1.0665E−11 | C41 | −5.1295E−17 | C58 | −2.1535E−20 |
| | C10 | 1.34349E−05 | C26 | −8.6063E−12 | C43 | −3.6526E−16 | C60 | 2.01763E−20 |
| | C11 | −4.8064E−08 | C28 | −1.1125E−12 | C45 | 1.46399E−15 | C62 | −1.2016E−20 |
| | C13 | 5.24071E−08 | C30 | 6.24714E−14 | C47 | −2.1563E−18 | C64 | 3.21408E−21 |
| | C15 | 9.53861E−08 | C32 | −3.4381E−14 | C49 | 2.86073E−18 | C66 | −1.4922E−19 |

TABLE 4

| Surface | ADE (°) | YDE (mm) |
|---|---|---|
| S0 | −1.163 | 0.0 |
| S23 | 29.000 | 0.0 |
| S24 | −43.000 | 0.0 |
| S25 | 30.000 | 0.0 |

Figure 7:
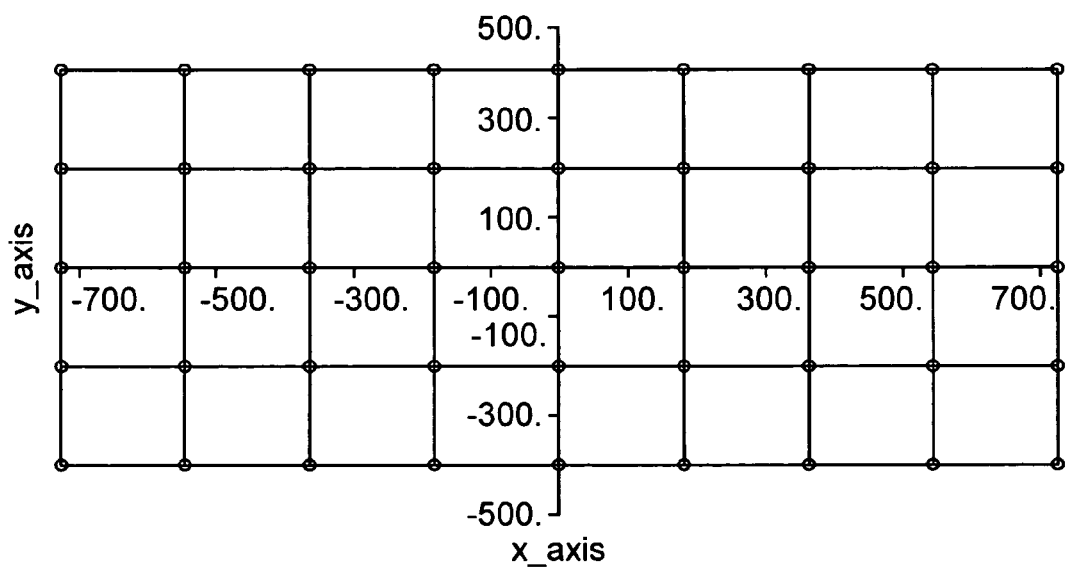
FIG. 7 is a view for showing distortion performances of the projection optical system, according to the present embodiment.

The numeral values of the above Tables 1 to 4 are those in an example of case when projecting the optical image (i.e., the modulated light image, upon which the light modulation is made within the region 16×9 on the screen of the liquid crystal panel 150, enlargedly, up to the size 1452.8×817.2 on the screen of the image display liquid crystal panel 170. The distortion of that instance is shown in FIG. 7. The vertical direction in this FIG. 7 corresponds to the vertical direction shown in FIG. 5, and also corresponds to the direction of Y-axis thereof. The horizontal direction in FIG. 7 corresponds to the direction perpendicular to the Y-axis on the image display liquid crystal panel 170, and the center of an oblong in the figure corresponds to the center of the screen. This figure shows the condition of curvature of each of straight lines, in particular, when displaying the screen while dividing it into four (4) in the vertical direction and eight (8) in the horizontal direction, thereby to show the state or condition of graphic distortion.

Figure 8:
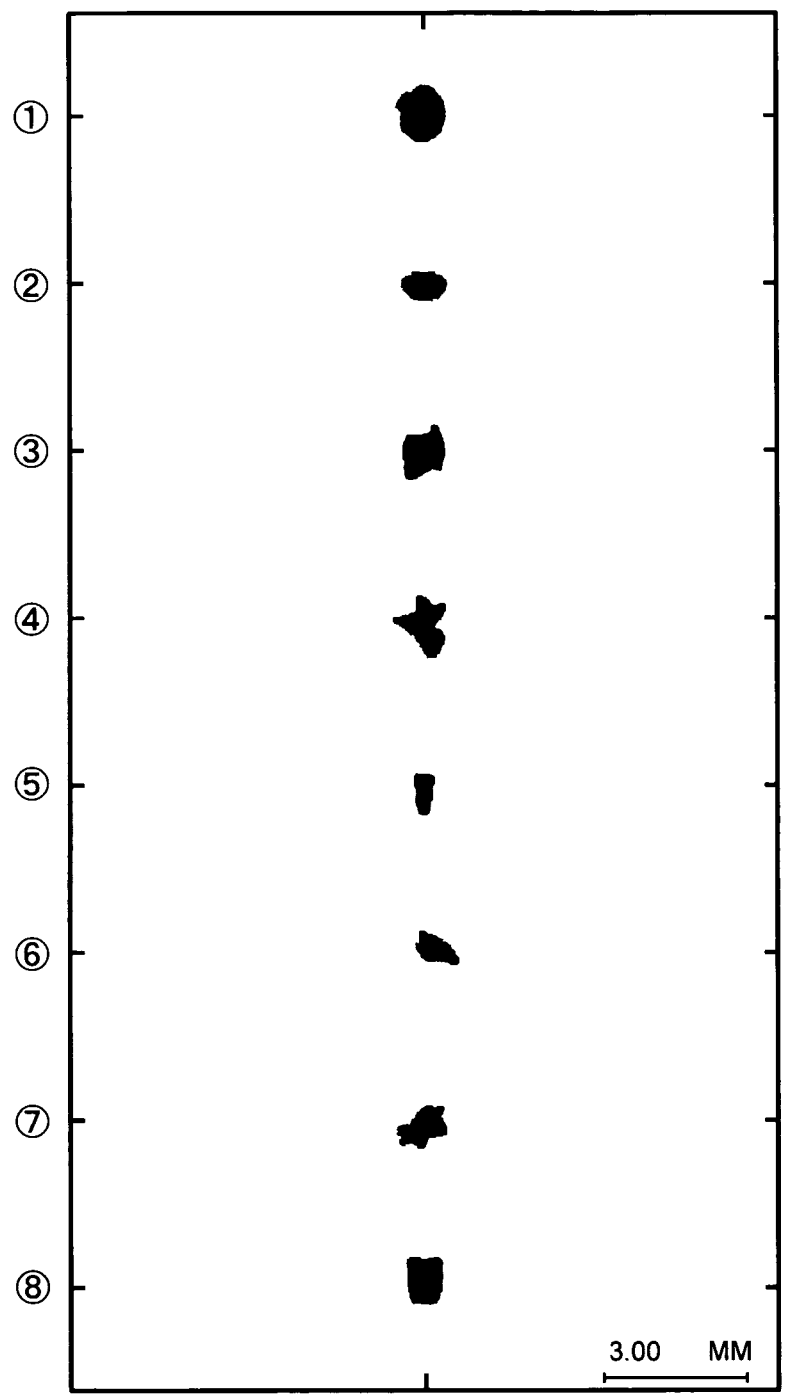
FIG. 8 is a view for showing spot performances of the projection optical system, according to the present embodiment.

Spot diagrams of the present numeric value embodiment are shown in FIG. 8. In this FIG. 8 are shown the spot diagrams of the light fluxes, emitting from eight (8) points on the display screen of the liquid crystal panel 150; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)). However, the unit thereof is "mm". The horizontal direction of each spot diagram corresponds to the X direction on the screen, while the vertical direction the Y direction on the screen. Both show that they maintain preferable performances.

In the above, mentioning is made on one example of the projection device. Further in the above, the light beam emitting from the projection lenses 2 is reflected upon the freely curved surface 4 and further upon the plane reflection mirror 5 to be turned back to the image display liquid crystal panel 170, in the structured thereof, but the present invention should not be restricted only to this, and it is needless to say that the plane reflection mirror for returning mentioned above may be omitted, depending upon the position of disposing the projection lenses.

Next, explanation will be made on one embodiment of the Fresnel lens sheet, functioning as the light direction conversion unit.

Figure 9A:
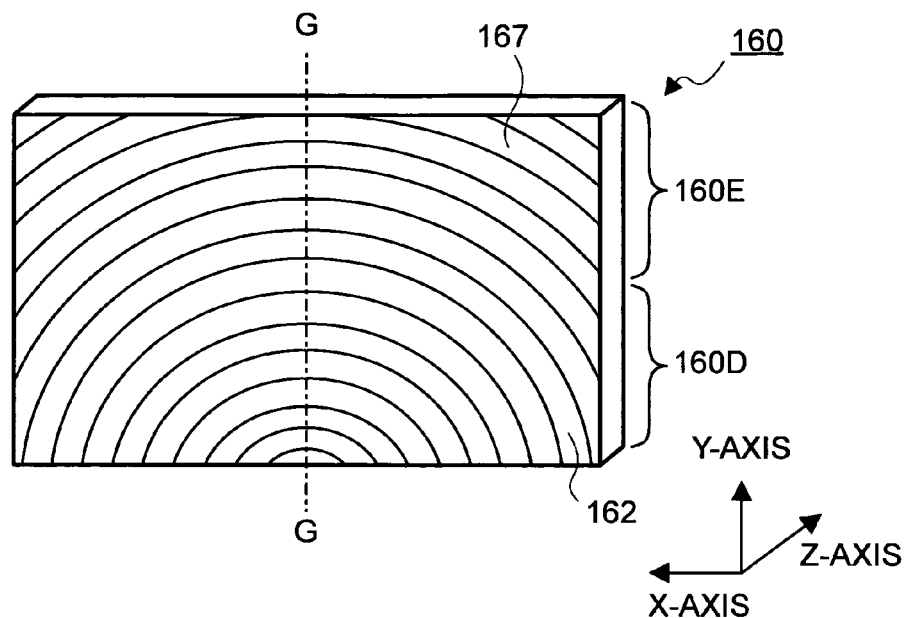
FIGS. 9a and 9b are diagrammatical structural views of a Fresnel lens, according to the present embodiment.
Figure 9B:
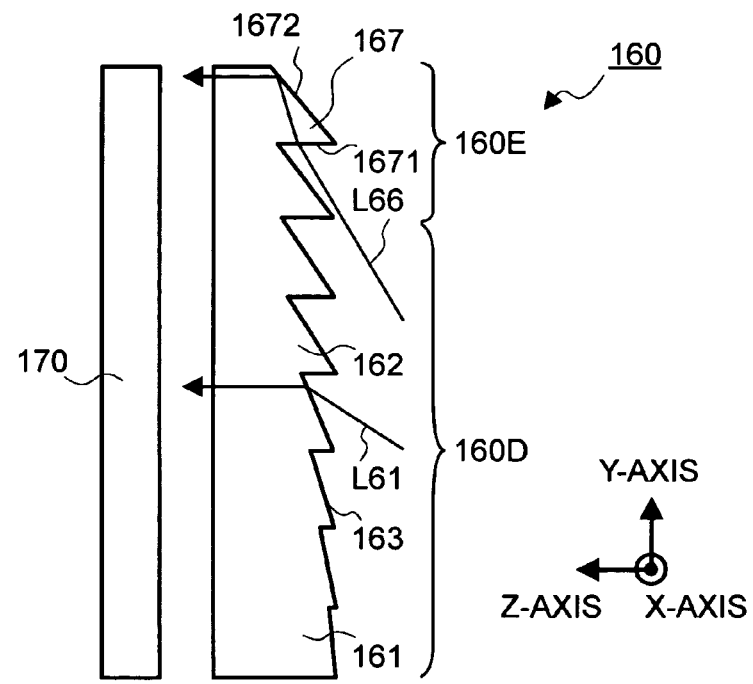

FIGS. 9(a) and 9(b) are views for showing the structures of the Fresnel lens sheet, diagrammatically, and in particular, FIG. 9(a) shows the perspective view when seeing the Fresnel lens sheet from the side of the projection device, and FIG. 9(b) the cross-section structure view thereof, cutting along a G-G line.

As shown in FIGS. 9(a) and 9(b), the Fresnel lens sheet 160 is constructed with a refraction region 160D, being located approximately corresponding to be the central side on the screen of the image display liquid crystal panel 170, and a total reflection region 160E, being located corresponding to the periphery side of the image display liquid crystal panel 170 and disposed so as to surround that refraction region 160D. Within the refraction region 160D are formed a plural number of refraction type Fresnel lenses 162, concentrically, upon the surface of a material 161 on the opposite side to that of the image display liquid crystal panel 170. Each of the Fresnel lenses 162 has a function of refracting the light beam L61, being projected from the projection lens device 10 and incident upon at an angle equal or less than a predetermined value thereof, thereby to be emitted onto the image display liquid crystal panel 170, vertically. Also, within the total reflection region 160E are formed a plural number of total reflection type Fresnel lenses, concentrically, upon the surface of the material 161 on the opposite side to that of the image display liquid crystal panel 170. Each of the total reflection Fresnel lenses 167 has a function for totally reflecting the light beam L66, being projected from the projection device 10 at the incident angle greater than the predetermined value, thereby to be emitted onto the image display liquid crystal panel 170, vertically.

As is well known, if constructing the Fresnel lens sheet from the refraction type Fresnel lenses, since the incident angle incident upon the Fresnel lens sheet (i.e., the angle defined between the normal line) comes to be large, as well as, since reflection can be easily generated upon the incident surface of the Fresnel lens, then the reflection loss increases, greatly, and therefore, it is dark on the peripheral portion of the screen. Then, according to the present embodiment, applying the technology shown in WO 2004/049059 therein, on the peripheral portion of the first image display liquid crystal panel 170 are disposed the total reflection type prism, within a region where the incident angle from the projection device 10 is equal or greater than a predetermined value.

First of all, explanation will be given on the refraction type Fresnel lens 162 within the refraction region 160D.

With connecting the prism surface 163 of each of the refraction type Fresnel lenses, on an arbitrary cross-section within the refraction regions 160D of the Fresnel lens 160, it is possible to obtain one (1) piece of a curved line (i.e., an envelope line). Assembling all the obtained envelope lines on the cross-section thereof defines one (1) piece of an imaginary surface. Hereinafter, this imaginary surface is called an "original surface".

The original surface accompanying with the refraction type Fresnel lenses constructing the refraction region 160D is a spherical surface, in general, within the projection type image display apparatus, but according to the present embodiment, it has an aspheric surface configuration corresponding to the incident angle of the light beam, which is incident from the projection lens device 10 upon the image display liquid crystal panel 170, with applying the technology of the Fresnel lenses disclosed in Japanese Patent Laying-Open No. 2006-154719 (2006) therein.

In this instance, Fresnel angle in an upper portion is larger than that in a lower portion, on each prism surface, within the refraction region 160D. With this, the light beam incident upon the incident surface within the refraction region 160D of the Fresnel lens sheet 160 is converted so as to be incident upon the incident surface of the image display liquid crystal panel 170, almost perpendicular thereto, covering all over the surfaces of the image display liquid crystal panel 170.

Figure 10:
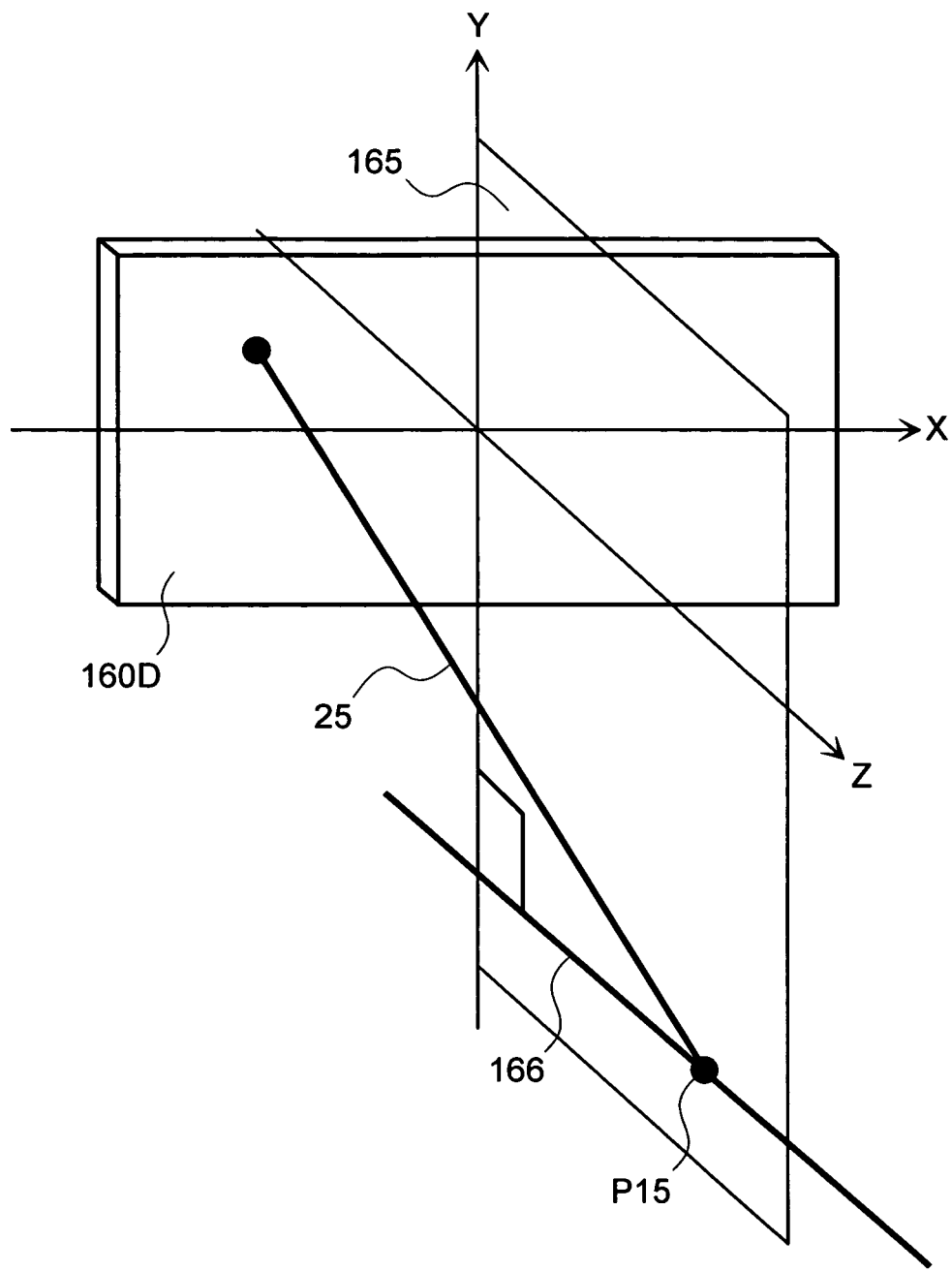
FIG. 10 is a view for explaining a method for determining a prism surface configuration, which builds up a refraction-type Fresnel lens sheet within a refraction area 160D.

Next, explanation will be made on the details of the method for determining the surface configuration of the plural number of prism surfaces 163 (i.e., the original surfaces of the Fresnel lenses), which is formed concentrically, on the refraction type Fresnel lenses 162 to be built up within the refraction region 160D mentioned above, by referring to the diagrammatic view shown in FIG. 10. However, as was mentioned above, the prism surfaces of the refraction type Fresnel lenses building up the refraction region 160D are formed, concentrically, surrounding a certain one (1) point (i.e., a rotation axis). And, the original surface for determining the Fresnel angle of the prism surface for each of the refraction type Fresnel lenses (i.e., an angle defined between the prism surface and a main plane surface of the Fresnel lens sheet 160) has an aspheric configuration. Herein, as was mentioned above, the original surface is that for determining the Fresnel angle for each prism surface, and it indicates that lens surface obtained when building up an entire of the refraction region 160D of the Fresnel lens sheet 160, as one (1) piece of lens. Thus, when determining the Fresnel angle of the prism surface for the refraction type Fresnel lenses, firstly it is assumed that the entire of the refraction regions 160D on the Fresnel lens sheet 160 has a certain lens characteristic, and the surface configuration of that lens is determined to be the original surface. And, the configuration, corresponding to each point of the refraction region 160D on that original surface (for example, a tangential line on the original surface at each point corresponding thereto), is extended onto the surface of the refraction region 160D. With this, the Fresnel angle of the prism surface is determined at each point of the refraction region 160D. Accordingly, a curve obtained by connecting each prism surface depending on that Fresnel angle, within the entire of the refraction region 160D, i.e., an envelope including an aggregate of all prism surfaces within the entire of the refraction region 160D of the Fresnel lens sheet presents the original surface mentioned above. Thus, the direction of refracted light on the prism surface at each point of the refraction region 160D is determined depending upon the configuration of the original surface mentioned above, corresponding to each prism thereof. Further, the rotation axis mentioned above is assumed to be orthogonal to the main plane (the XY plane in FIG. 10) of the Fresnel lens sheet 160 (i.e., the plane including Z-axis). Also, this rotation axis includes a point P15, at which the light beam 25 incident upon the Fresnel lens sheet 160 intersects the plane 165 (i.e., the plane parallel to the YZ plane) dividing the Fresnel lens sheet 160, vertically, the left and the right, equally. Thus, the rotation axis is an axis, being perpendicular to the main plane of the Fresnel lens sheet 160 (i.e., being in parallel to the normal line 8 of the first image display liquid crystal panel 170; thus, an axis 166 shown in FIG. 10.

However, in the above-mentioned, because the incident light beam 25 changes the incident angle (i.e., the angle to the normal line of the incident surface) depending on the position on the image display liquid crystal panel 170, therefore herein, there must be also a plural number of axes 166, which can be obtained from the above-mentioned. However, among of those plural number of axes, the axis at the almost center thereof is assumed to be the rotation axis of the refraction type Fresnel lens (i.e., the central position of the concentric-like prism building up the refraction type Fresnel lens).

Following to the above, the configuration (i.e., the angle) of the Fresnel angle is obtained, for each of the prism surfaces, as follows. First of all, there is obtained an angle of the prism, for emitting the light incident upon the image display liquid crystal panel 170 into the direction of the normal line mentioned above (i.e., 0 degree in an emission angle), while refracting it on the prism surface of the refraction region 160D, in accordance with the Snell's law, for each of the points on the refraction region 160D. Next, the original surface (aspheric surface) of the refraction type Fresnel lenses is made up with continuing the prism surfaces obtained.

However, this original surface obtained can be approximated by the equation of aspheric surface of the following (Eq. 5):

$$Z = \frac{cr^2}{1 + \sqrt{1 - (1+k)c^2 r^2}} + A \cdot r^4 + B \cdot r^6 + C \cdot r^8 + D \cdot r^{10} + E \cdot r^{12} + F \cdot r^{14}$$

Herein, "Z" is an amount of sag, "r" the distance from the optic axis, "c" the curvature at an apex, "k" a conic constant (or, conical constant), "A" to "J" coefficients (the aspheric surface coefficients) of a term of power of "r".

In this instance, further, comparison is made between the aspheric coefficients approximated and an actual emission angle of the light beam, and necessary amendment and/or changing are added, appropriately, upon the position of the rotation axis and/or the aspheric surface coefficients, so as to bring the emission angle into almost 0 degree.

In this manner, portions of the refraction region 160D of the Fresnel lens sheet 160 are conducted with the elements obtained in the above, i.e., positions of the rotation axes, to be the rotation centers of the concentric prism portions building up the refraction type Fresnel lenses, and the aspheric coefficients of the original surface, which is formed by the aggregate of the respective prism surfaces.

Figure 11:
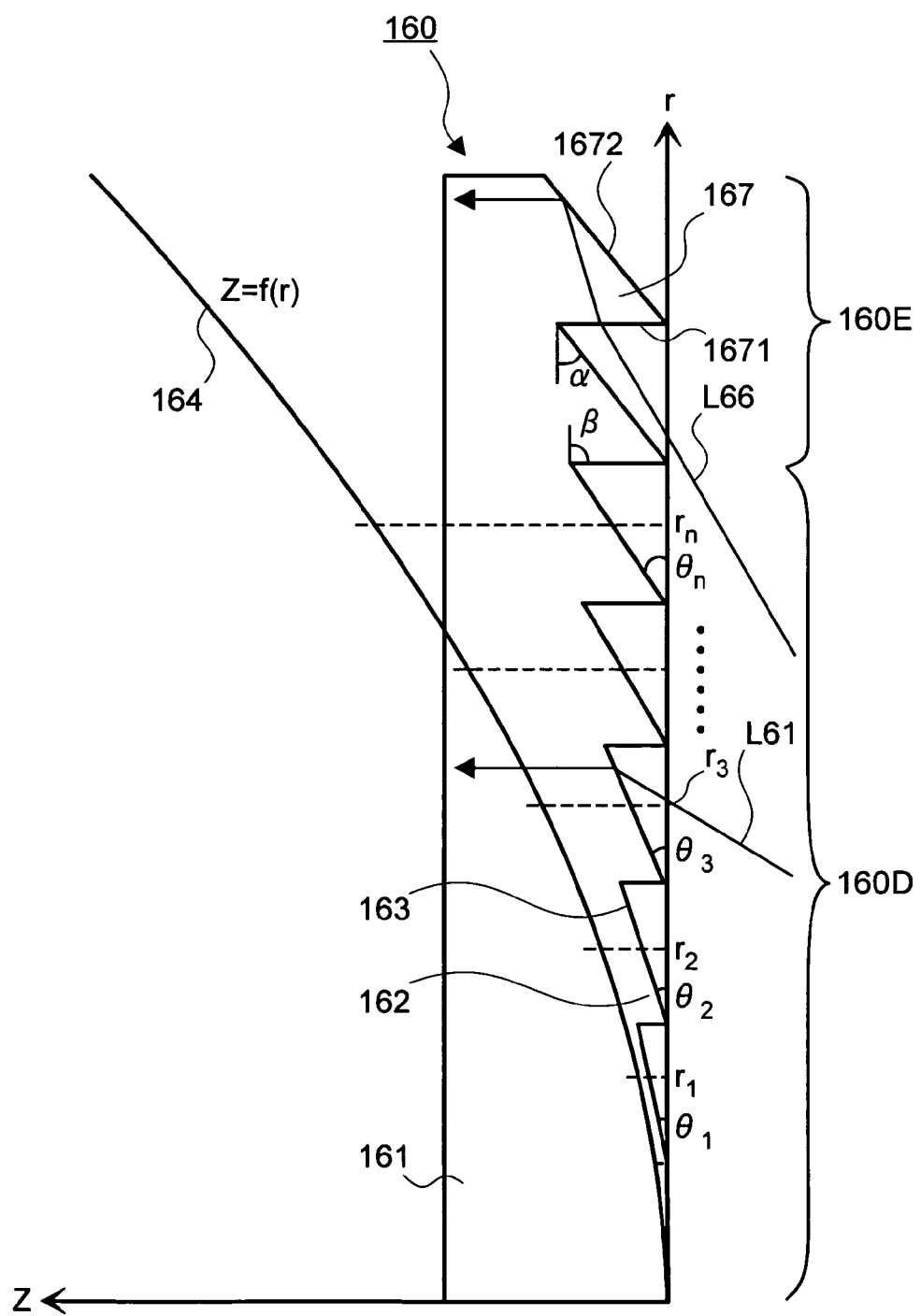
FIG. 11 is a view for showing a relationship between the prism surface and an original surface within the refraction area 160D.

FIG. 11 shows the diagrammatic cross-section of the Fresnel lens sheet 160, which is made up through the processes mentioned above. This FIG. 11 shows the cross-section view of the Fresnel lens sheet 160 cutting along a plane, being parallel to the normal line of that Fresnel lens sheet 160 and including the rotation axis mentioned above.

In FIG. 11, Z=f(r) is a polynomial expression for expressing the original surface of aspheric surface configuration accompanying with the refraction type Fresnel lenses, within the refraction region 160D of the Fresnel lens sheet 160, and it can be expressed by the equation (Eq. 5). Herein, "r" corresponds to "r" in (Eq. 5) mentioned above, and presents the distance from the rotation axis. The Fresnel angle "θ1" of the prism surface 163 of the reflection type Fresnel lenses at the distance "r1" (i.e., the angle defined between the main plane of the Fresnel lens sheet 160 and the prism surface) is nearly equal to an inclination (i.e., a tangent) of the original surface 164 at the distance "r1". Thus, assuming that the aspheric surface equation of the original surface expressed by the (Eq. 5) is Z=f(rn), and that "n" is an integer equal or greater than "1", then the Fresnel angle "θn" at each position on the refraction region 160D can be expressed by the following (Eq. 6)

$$\theta n = f(rn)'$$

Therefore, the following can be obtained, i.e., θ1=f(r1)', θ2=f(r2)', θ3=f(r3)' . . . . In this manner the Fresnel angle "θn" at each position of the refraction region 160D almost corresponds to a differential value at each position of the aspheric surface equation (i.e., each distance "rn"). In this manner, the Fresnel angle "θn" is determined at each position of the refraction region 160D within the Fresnel lens sheet 160.

As was mentioned above, the light beam incident from the projection lens device 10 upon the refraction region 160D of the Fresnel lens sheet 160 is refracted upon each prism surface 163 of the refraction type Fresnel lenses. As was mentioned above, if bringing the original surface 164 of the refraction type Fresnel lens into the aspheric surface configuration depending on the incident angle of the incident light beam upon each position of the refraction region 160D, then each light beam refracted upon each prism surface 163 is almost parallel to the normal line of the Fresnel lens sheet 160. Herein, as is apparent from FIG. 11, the Fresnel angle "θ" of the prism surface 163, locating at an upper portion of the refraction region 160D of the Fresnel lens sheet 160 (i.e., at a position on the image display liquid crystal panel, being in an upper portion in the vertical direction and being far from the rotation axis) is determined to be larger than the Fresnel angle "θ" of the prism surface 163, locating at a lower portion of the refraction region 160D of the Fresnel lens sheet 160 (i.e., at a position on the image display liquid crystal panel, being in a lower portion in the vertical direction and being near to the rotation axis). This is because, in the oblique projection according to the present embodiment, the incident angle of the light beam is larger, in the upper portion of the image display liquid crystal panel, than that in the lower portion of the image display liquid crystal panel.

Next, explanation will be given on the total reflection type Fresnel lenses 167 within the total reflection region 160E, by referring to FIG. 11.

As is shown in FIG. 11, each of the total reflection type Fresnel lenses within the total reflection region 160E includes a refraction surface 1671 and a total reflection surface 1672. The light beam L66 incident upon the total reflection type Fresnel lens 167 is refracted upon the refraction surface 1671 thereof, and directed toward the total reflection surface 1672. And, it is totally reflected upon the total reflection surface 1672, to be emitted from the Fresnel lens sheet 160, and thereby being incident upon the image display liquid crystal panel 170 perpendicular thereto.

For achieving to bring the incident light beam to emit onto the image display liquid crystal panel 170, perpendicularly, an angle "α", defined between the total reflection surface 1672 and the main plane, is so determined that it comes to be small, gradually, from the total reflection type Fresnel lenses near to the projection device 10 up to the total reflection type Fresnel lenses far from that, and an angle "β", defined between the refraction surface 1671 and the main plane, is so determined, on the contrary thereto, that it comes to be large, gradually, from the total reflection type Fresnel lenses near to the projection lens device 10 up to the total reflection type Fresnel lenses far from that. In this manner, it is possible to emit the light beam incident upon the total reflection region toward the image display liquid crystal panel 170, perpendicularly.

With such the structures of the Fresnel lens sheet as was mentioned above, it is possible to convert the light beam, being projected from the projection lens device 10 toward the image display liquid crystal panel 170, into that incident upon the image display liquid crystal panel 170 to have the incident angle of nearly 0 degree, so as to be emitted therefrom. Accordingly, with using the Fresnel lens sheet according to the present embodiment, since the light beam from the projection lens device 10 is incident upon the image display liquid crystal panel 170 in parallel to the normal line thereof (i.e., perpendicular to the image display liquid crystal panel 170), it is possible to display the image or picture of high contrast upon the image display liquid crystal panel 170.

Further, although the explanation was given that, both the refraction region and the total reflection region are provided on the incident side of the sheet, with the Fresnel lens sheet mentioned above, however the present should not be restricted only to this. For example, as is described in Japanese Patent Laying-Open No. 2005-91541 (2006), which was filed by the present inventors, it is also possible to provide the total reflection region on the peripheral portion where the incident angle is equal or greater than a predetermined value, on the incident side of the sheet, while providing the refraction region at a central portion where the incident angle is equal or less than the predetermined value, on the emission side of the sheet.

Embodiment 1

With the image displaying apparatus shown in FIG. 1, since distribution of an amount of lights (or, distribution of light intensity or distribution of luminance) irradiated from the light source 110 upon the liquid crystal panel is not uniform (or, equalized), there is a possibility of generating unevenness in brightness of the image displayed on the image display liquid crystal panel. Then, explanation will be made on a projection image forming apparatus, according to the embodiment 1, in which an integrator is inserted between the light source and the liquid crystal panel, for informing the light amount distribution of the illumination light from the light source, by referring to FIG. 12.

Figure 12:
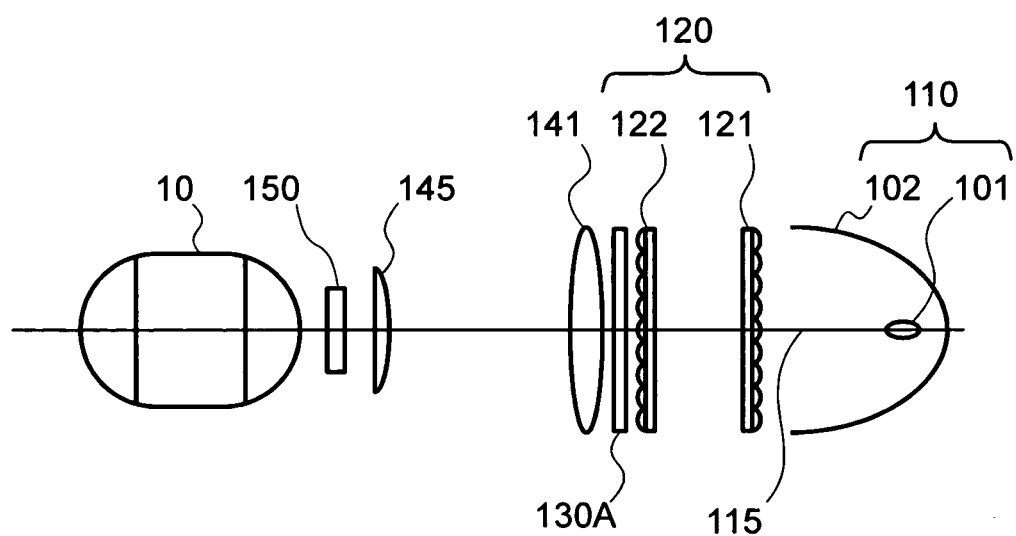
FIG. 12 is a diagrammatical structural view a projection image forming apparatus, according to an embodiment 1.

FIG. 12 is the structure view of the lighting apparatus, according to the embodiment 1.

As is shown in FIG. 12, the projection image forming apparatus according to the present embodiment includes a light source 110, a first multi-lens element 121 and a second multi-lens element 122, functioning as a multi-lens type integrator 120 in a pair thereof, a polarized light conversion element 130A, a pileup lens 141, a field lens 145, a second liquid crystal panel 150, a projection lens device 10.

The light source 110 comprises a lamp 101 and a reflector 102. The lamp 101 is a while color lamp, such as, the high-pressure mercury lamp, for example. The reflector 102 has a reflection surface of rotationally parabolic configuration, for example, which is disposes so that it covers the lamp 101 from the rear side thereof, and it has an emission opening having a circular or polygonal shape.

A light emitted from the lamp 101 is reflected upon the reflector 102 having the rotationally parabolic configuration, to be almost parallel to an optical axis 115; i.e., an almost parallel light beam is emitted from the light source 110. The light emitted from the light source 110 is incident upon the integrator of the multi-lens type.

The multi-lens type integrator 120 is made up with the first multi-lens element 121 and the second multi-lens element 122.

The first multi-lens element 121, having a rectangular shape almost similar or analogous to the liquid crystal panel 150 as the second light modulator unit and the image display liquid crystal panel 170 as the first light modulator unit when seeing it into the direction of the optical axis 115 and being made up with a plural number of lens cells arranged in a matrix manner, divides the light incident thereupon from the light source into a plural number of lights through the plural number of the lens cells; i.e., guiding them to pass through the second multi-lens element 122 and the polarized light conversion element 130A, effectively. Thus, the first multi-lens element 121 is so designed that it is in an optically conjugated relationship with the lamp 101 and each of the lens elements of the second multi-lens element 122.

In the similar manner to that of the first multi-lens element 121, with the second multi-lens element 122, having a rectangular shape almost similar or analogous to the liquid crystal panel 150 and the image display liquid crystal panel 170 when seeing it into the direction of the optical axis 115 and being made up with a plural number of lens cells arranged in a matrix manner, each of the lens cells building up projects (or, mapping) the configuration of the lens cell of the first multi-lens element 1 corresponding thereto, upon the pileup lens 141 and the liquid crystal panel 150, respectively.

In this course or process, upon the polarized light conversion element 130A are aligned the lights from the second multi-lens element 122 into a predetermined polarization direction. And, the projection image by each of the lens cells of the first multi-lens element 121 is piled up thereon, respectively, by means of the pileup lens 141, and after being converted to be almost parallel with the optical axis 115 through the field lens 145, they are piled up on the liquid crystal panel 150.

However, since the second multi-lens element 122 and a condenser lens 141, which is disposed near to this, are so designed that they are optically in the relationship between a subject and an image (i.e., the conjugated relationship), with each of the lens cells of the first multi-lens element 121, then the light beams divided into a plural number thereof through the first multi-lens element 121 are projected upon the liquid crystal panel 150, by means of the second multi-lens element 122 and the pileup lens 141, piling up each other, and thereby brining the light amount distribution upon the liquid crystal panel 150 to be uniform.

Herein, explanation will be made about the function of polarized light conversion of the polarized light conversion element 130A, by referring to FIG. 13. This FIG. 13 is a view for showing the cross-section structures of the polarized light conversion element, cutting along the longitudinal side of the liquid crystal panel including the optical axis of the polarized light conversion element.

Figure 13:
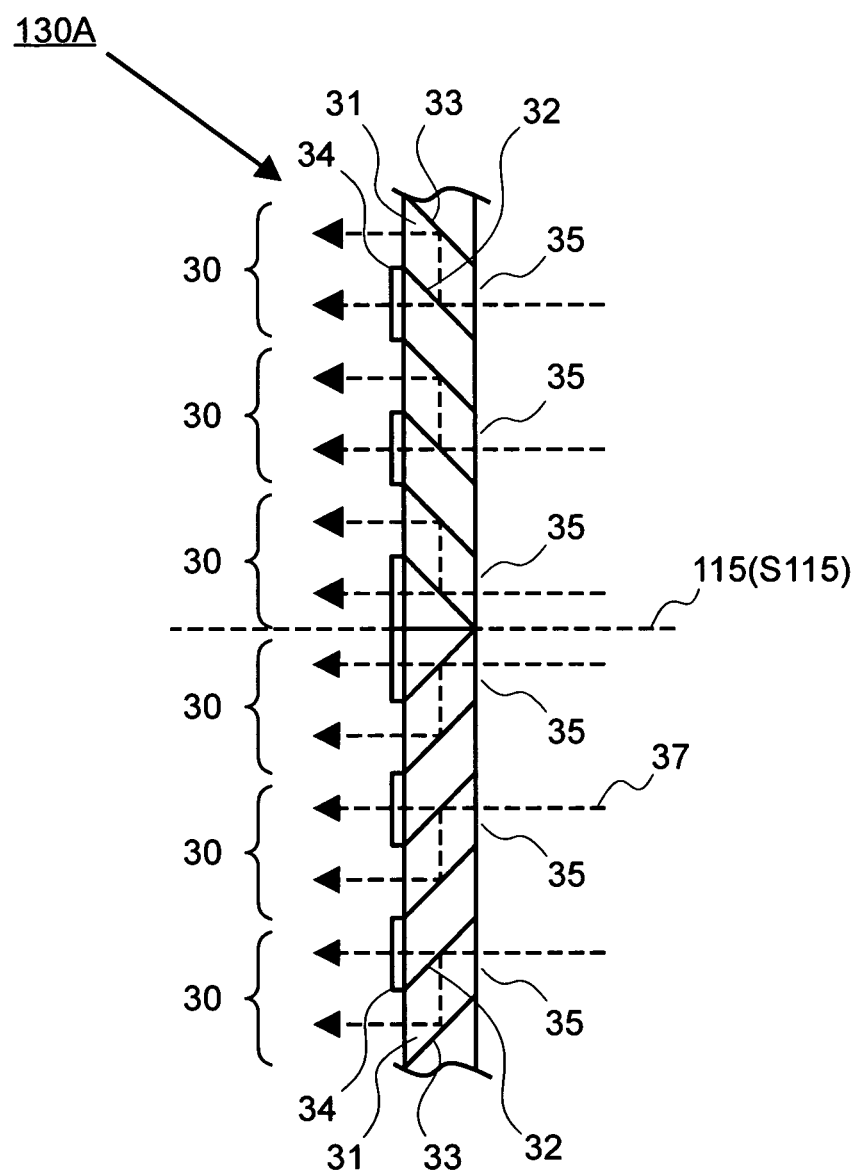
FIG. 13 is a cross-section structural view of a polarized light converter element, according to the embodiment 1, cutting it along a longitudinal side of a liquid crystal panel including an optical axis thereof.

As is shown in FIG. 13, within the polarized light conversion element 130A, a plural number of translucent materials 31, each being a parallelogram column extending along the direction in parallel with the short side of the second liquid crystal panel 150, are arranged in parallel with the longitudinal side of the liquid crystal panel 150, in the manner of an array, in parallel with the surface perpendicular to the direction of the optical axis 115, and on boundary surfaces defined between the translucent materials 31 neighboring to each other, which are disposed in the manner of the array, there are arranged a polarized light beam splitter films (hereinafter, being abbreviated "PBS film") 32 and a reflection film 33, alternately. Also, on the emission surface, from which the light emits, passing through an opening portion 35 on the incident side of the polarized light conversion element 130A and penetrating through the PBS film 32, there is provided a λ/2 phase difference plate 34. Also, the polarized light conversion element 130A is constructed to be symmetric with respect to a surface that is defined the optical axis 115 and an extending direction of the translucent material 51 of the parallelogram column (i.e., the plane including the optical axis 115, and conveniently, being called an "optical axis surface", hereinafter).

Upon the polarized light conversion element 130A constructed as was mentioned above, for example, S-polarized light, among the light beam 37 being incident upon the first multi-lens element 121, the second multi-lens element 122 and the opening portion 35, is reflected upon the PBS film 32, and is also reflected upon the reflection mirror 33, thereby being emitted as the S-polarized light therefrom. Also, the light of P-polarized light passes through the PBS film 32, and is converted into the S-polarized light through the λ/2 phase difference plate 34 provided on the emission surface, thereby being emitted therefrom. With providing such polarized light conversion units 30, as a basic element, in a plural number thereof, the polarization direction of the light incidence upon the polarized light conversion element 130A is aligned into the light in a predetermined polarization direction (herein, the light of S-polarization), thereby to be emitted therefrom. In case when aligning it into the P-polarized light, it is enough to provide the λ/2 phase difference plate 34 on the emission surface of the S-polarized light.

As was mentioned above, it is possible to irradiate the liquid crystal panel 150, uniformly or equally, by means of the multi-lens type integrator 120, which is constructed with a pair of the first multi-lens element 121 and the second multi-lens element 122.

Embodiment 2

In the embodiment 1 is used the multi-lens type integrator 120, which is made from the pair of the first multi-lens element 121 and the second multi-lens element 122, as the integrator for uniformizing (or equalizing) the illumination lights. Next, explanation will be made on the lighting apparatus, according to the embodiment 2, applying a rod-type integrator, as a kind of the integrator, by referring to FIG. 14.

However, as such the rod-type integrator may be applied a light funnel or a rod lens, etc., for example, but herein is applied the light funnel. Also, as the liquid crystal panel, the reflection-type liquid crystal panel is applied, herein. However, the present invention should not be restricted to this, but the rod lens may be applied in the place of the light funnel, and also may be applied a DMD (Digital Micro Mirror Device) element aligning micro mirrors in the 2-D manner, or a transmission-type liquid crystal panel, though it changes the structure of the optical system thereof.

Figure 14:
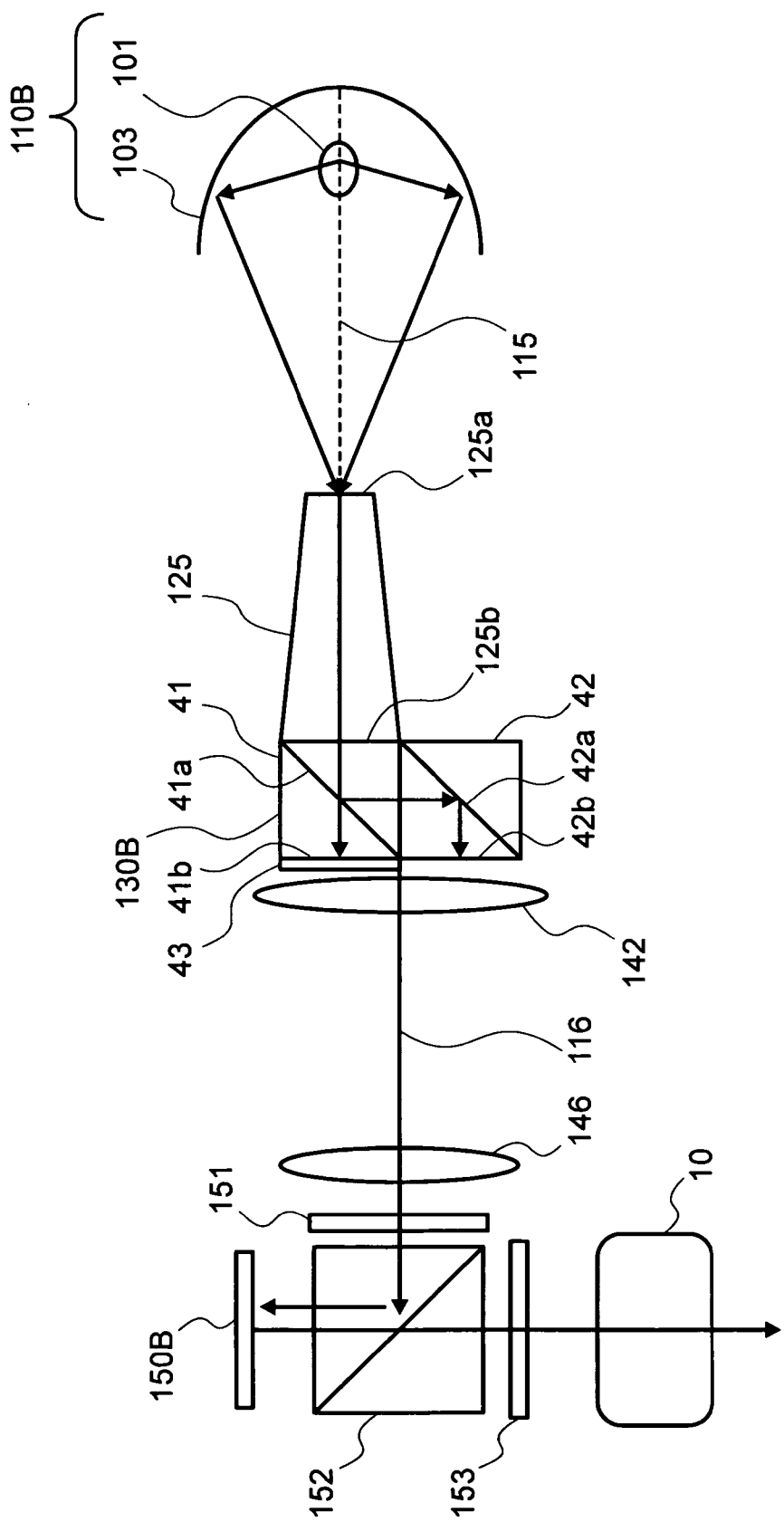
FIG. 14 is a diagrammatical structural view a projection image forming apparatus, according to an embodiment 2.

FIG. 14 is a view for diagrammatically showing the structures of the light device, according to the embodiment 2.

As is shown in FIG. 14, the projection image forming apparatus, according to the present embodiment, includes a light source 110B, a light funnel 125, functioning as the integrator, a polarized light conversion element 130B, a light condensing lens 142, a field lens 146, a polarizing plate 151, a polarized light beam splitter prism (hereinafter, being abbreviated as "PBS prism") 152, a reflection-type liquid crystal panel 150B, a polarizing plate 153, and a projection lens device 10.

The light source 110B comprises a lamp 101 and a reflector 103. The lamp 101 is a white color lamp, such as, the high-pressure mercury lamp, for example. The reflector 103 is disposed so as to cover the lamp 101 from the rear side thereof, and has the reflection surface of configuration in an ellipsoid of revolution, or a spheroid.

The light emitting from the lamp 101, which is disposed at a first focal point of the reflector 103, is reflected upon the reflector 103 having the reflection surface of the spheroid configuration, and is condensed onto an incident surface 125a of the light funnel 125, which is disposed in vicinity of a second focal position of the reflector 103, to be incident thereupon.

Thus, the reflector 103 functions as a light condenser unit for condensing the light emitted from the lamp 101 onto the incident surface 125 of the light funnel 125. Of course, in the similar manner to that of the embodiment 1, it is possible to apply the reflection mirror of the spheroid configuration, as the reflector 103, so as to condense the light onto the incident surface 125a of the light funnel 125.

The light funnel 125 is constructed with a hollow optical pipe (i.e., a light pipe), such as, a kaleidoscope, for example, and has a function of uniformizing (or equalizing) the distribution of the light amount of the incident light, repeating the total reflection of the incident light by a plural number of times. Herein, a light pipe is applied, in which a cross-section area perpendicular to the optical axis 115 comes large, gradually, toward the emission side. However, there may be applied a solid rod lens in the place thereof.

The light beam incident upon the light funnel 125 repeats the total reflection on the side surface of the light funnel, a plural number of times, and is in the condition that the lights of various angles are piled up on the emission surface 125b; i.e., the distribution of light mount becomes uniform. Also, since the cross-sectional configuration of the light funnel 125 comes large on the emission side, then the light beam angle emitting from the emission surface 125b is nearly or almost parallel to the optical axis. The light emitting from the light funnel 125 is incident upon the polarized light conversion element 130B.

The polarized light conversion element 130B includes a PBS prism 41 having a PBS film 41a, which is provided on the emission surface 125b of the light funnel 125, a total reflection prism 42 having a total reflection film 42a, which is disposed on the side, into which the S-polarized light reflecting upon the PBS film 41a of the PBS prism 41 directs, and a λ/2 phase difference plate 43 provided on the emission surface 41b, from which the P-polarized light penetrating through the PBS film 41a of the PBS prism 41 emits.

Among the lights having no polarization, being incident from the light funnel 125 upon the PBS prism 41 of the polarized light conversion element 130B and uniform in the distribution of light amount, the light of S-polarization (i.e., the S-polarized light) is reflected upon the PBS film 41a, to be incident upon the total reflection prism 42, and is reflected upon the total reflection film 42a, thereby emitting from the emission surface 42b of the total reflection prism. Also, the light of P-polarization (i.e., the P-polarized light) incident upon the PBS prism 41 penetrates through the PBS film 41a, to be emitted from the emission surface 41b, and it is further converted into the S-polarized light through the λ/2 phase difference plate 43, to be emitted therefrom. In this manner, the lights having no polarization, being incident upon the polarized light conversion element 130B, are aligned into the S-polarized light through the polarized light conversion element 130B.

However, since upon the polarized light conversion element 130B is incident the light beam, which made nearly parallel to the optical axis 115 through the light funnel 125 extending to the emission side, then it is possible to achieve separation of the polarized lights by means of the PBS film 41a, with high efficiency. Also, the configuration of the emission surface of the polarized light conversion element 130B, which is made up with the emission surfaces 41b and 41b, is almost analogous to that of the reflection-type liquid crystal panel 150B.

The light condenser lens 142 is a relay lens for mapping the emission surface of the polarized light conversion element 130B onto the reflection-type liquid crystal panel 150B.

The S-polarized light emitting from the polarized light conversion element 130B is condensed through the light condenser lens 142, is made nearly parallel to the optical axis, by the function of the field lens 146, and it passes through the polarizing plate 151 and reflected upon the PBS prism 152, thereby to be incident upon the reflection-type liquid crystal panel 150B.

Since the modulation light image is made of the P-polarized light, which is formed through modulation by the reflection-type liquid crystal panel 150B, then this time, it penetrates through the PBS prism 152, and it is increased in the contrast thereof by the polarizing plate 153, thereby to be enlarged and projected through the projection device 10 toward the image display liquid crystal panel.

Embodiment 3

Explanation will be made on an image displaying apparatus, according to an embodiment 3, by referring to FIG. 15.

The image display apparatus, according to the present embodiment, differs from the embodiment 2 mentioned above, in an aspect that a color wheel is disposed in vicinity of the incident surface 125a of the light funnel 125, as a time-division color separation unit. With using the color wheel, it is possible to achieve time-division display (i.e., sequential color display) of a color image, on the image display light modulation unit for conducting a monochromatic display (i.e., white-black display). Accordingly, in case when conducting the color display, though one (1) pixel is constructed with a set of color pixels (i.e., R-pixel, G-pixel, and B-pixel), however in case of the monochromatic display, since the display is made by one (1) pixel, then it is possible to use a panel having a less number of pixels, as a whole. Then, it is possible to achieve the cost down.

FIG. 15 is a view for showing the diagrammatic structures of the image display apparatus, according to the embodiment 3.

In FIG. 15, a reference numeral 180 depicts a color wheel, and 170B a image display liquid crystal panel for conducting the monochromic display mentioned above.

The color wheel 180 is a disc, being made up with a R-light filter 181 for penetrating through a R-light (red color light), a G-light filter 182 for penetrating through a G-light (green color light), and a B-light filter 183 for penetrating through a B-light (blue color light), each extending in the peripheral direction, at a predetermined ratio thereof, and has a rotation axis (not shown in the figure) at a center thereof, to be rotated by a driver unit not shown in the figure at high speed. The color wheel 180 being constructed in this manner is disposed, between the light source 110B and the light funnel 125, in the vicinity of the incident surface 125a of the light funnel 125.

The focus light of nearly white color emitted from the light source 110B is separated, time-sequentially, by means of the color wheel 180, into R-light, G-light and B-light.

And, the color light, upon which the color separation is made through the color wheel 180 is incident upon the light funnel 125, and after being equalized or uniformed in the light amount distribution thereof, comes to be the S-polarized light upon the polarized light conversion element 130B, and further modulated, according to the second video signal, upon the reflection-type liquid crystal panel as the second light modulator unit, and the said light modulation image is irradiated, enlargedly, upon the image display liquid crystal panel 170B as the first light modulator unit, by the projection device 10. The image display liquid crystal panel 170B conducts the light modulation upon the enlarged modulation light image irradiated thereupon, again, according to the first video signal, as the pseudo secondary light source, thereby building up an image of high contrast. Through such processes, an image of the R-light, and image of G-light and an image of B-light are formed on the image display liquid crystal panel 170B, time-sequentially, and are visually acknowledged, as a color image.

According to the present embodiment, it is possible to achieve the cost down of the color direct-view type image display apparatus.

However, in the above is applied the reflection-type liquid crystal panel to be the second light modulation unit, but may be applied the DMD element aligning micro mirrors in the 2-D manner, in the place thereof. Since the DMD element is larger in the contrast ratio than the liquid crystal panel, therefore it can be applied, more preferably.

By the way, within the embodiments mentioned above, the image display liquid crystal panel 170B was motioned to comprise the polarizing plates on both, the incident side and the emission side thereof. However, in case of the direct-view type image display apparatus, the screen size thereof is large. Then, when applying the liquid crystal panel as the second light modulator unit, there is a possibility of deleting the incident side polarizing plate of the image display liquid crystal panel 170B as the first light modulator unit, if increasing a degree of polarization, with provision of two (2) pieces of the polarizing plates to be disposed in front or rear of the liquid crystal panel on the optical path thereof, for example, the polarizing plates on the emission side thereof. In this case, the size of the polarizing plate accompanying with the liquid panel is nearly equal to the liquid crystal panel, and then the cost down obtained by deleting the polarizing plate on the incident side of the image display liquid crystal panel 170B is larger than that obtained by the two-pieces structure of the polarizing plate on the emission side, and therefore, it is possible to achieve the cost down of the direct-view type image display apparatus. Also, in case when applying the DMD element as the second light modulator unit, since it is possible to obtain the contrast ratio sufficiently larger than that of the liquid crystal panel, with using the DMD element therein, there is also a possibility of deleting the polarizing plate on the incident side of the image display liquid crystal panel 170B.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image displaying apparatus, comprising:
    a first light modulator unit, including a transmission-type liquid crystal panel therein, disposed at a side of the image displaying apparatus nearest to an observer, and configured to modulate a light incident thereon, in response to a first video signal, thereby forming a first image;
    at least one second light modulator unit, configured to modulate a light from a light source, in response to a second video signal; and
    an enlarged image forming unit, disposed on a light incidence side of said first light modulator unit, upon which a light modulated within said second light modulator unit is enlarged and projected, thereby forming a second image thereon;
    wherein a size of said first light modulator unit is larger than a size of said second light modulator unit;
    wherein upon said first light modulator unit is incident of the light of the second image, which is formed on said enlarged image forming unit, and said first image is formed through modulation of the light of said second image responding to said first video signal;
    wherein the brightness of each of said first image and said second image is controlled, respectively, such that said second image can be seen transparently through said first image; and
    wherein both said first image and said second image are displayed on a plurality of display surfaces located at a variety of depth positions as seen by an observer, and displayed with differing brightness that differs based upon depth positions as seen by the observer.

2. The image displaying apparatus, as described in the claim 1, wherein an optical direction conversion unit for converting a direction of light incident upon first light modulator unit is provided in a vicinity of an incident side of said first light modulator unit.

3. The image displaying apparatus, as described in the claim 1, wherein said optical direction conversion unit includes a Fresnel lens sheet or a light diffuser sheet.

4. The image displaying apparatus, as described in the claim 1, wherein each of said first light modulator unit and said second light modulator unit is a liquid crystal panel, enabling to modulate by each of a plurality of pixels corresponding to a video signal, respectively.

5. The image displaying apparatus, as described in the claim 1, wherein said second light modulator unit is a reflection-type liquid crystal panel, which is configured to modulate the second light by each of a plurality of pixels corresponding to a video signal.

6. The image displaying apparatus, as described in the claim 1, further comprising:
    a projection lens device, configured to project an enlarged image of a second picture from said second light modulator unit, upon said enlarged image forming unit;
    wherein said projection lens device includes a rotationally asymmetric mirror and a rotationally asymmetric lens.

7. The image displaying apparatus, as described in the claim 1, further comprising:
    a polarized light converter unit configured to convert the light from said light source into a desired polarized component;
    wherein said second light modulator unit modulates an intensity of the light from said polarized light converter unit corresponding to the video signal.

8. The image displaying apparatus, as described in the claim 7, wherein said light source is a light emitting diode.

9. The image displaying apparatus, as described in the claim 7, wherein said light source is a semiconductor laser.

10. The image displaying apparatus, as described in the claim 7, further comprising:
    a first multi-lens element, having a plurality of convex lenses aligned 2-dimensionally, and configured to divide a light flux from said light source into a plurality of light fluxes; and
    a second multi-lens element, provided opposite to said first multi-lens element;

wherein said polarized light converter unit is configured to convert the plurality of light fluxes emitted from said second multi-lens element into the desired polarized component.

11. The image displaying apparatus, as described in the claim 7,
wherein a ratio L1/L2, of a diagonal size L2 representing an image display area of said second light modulator unit, and a diagonal size L1 representing an image display area of said first light modulator unit; and
wherein the ratio L1/L2 satisfies the following condition:

$$10 < L1/L2 < 150.$$

12. The image displaying apparatus, as described in the claim 7, further comprising:
a projection lens device, configured to project an enlarged image of the second image from said second light modulator unit onto said enlarged image forming unit, wherein said projection lens device includes:
a first mirror including a rotationally asymmetric reflection surface; and
a prosection lens, including:
a first group of projection lenses, at least one (1) surface of a plurality of lens surfaces being rotationally asymmetric, and located by a side of the second light modulator unit of said first mirror, and
a second group of projection lenses, having a positive refraction power as a whole thereof, and within an effective cross-section size of said first mirror in a direction perpendicular to the screen differs from that of another, on the size on a side near to said first light modulator unit, with respect to an optical axis of said projection unit.

13. An image displaying apparatus, comprising:
a projection image forming apparatus; and
a first light modulator unit, applied to a transmission-type liquid crystal display panel, disposed at a position on a side closest to an observer, and configured to modulate a projection image formed by said projection image forming apparatus, thereby obtaining a first image as a picture to be displayed;
wherein said projection image forming apparatus includes:
a light source;
at least one second light modulator unit, configured to modulate a light from said light source, depending on a video signal; and
a projection lens device, configured to project the light modulated by said second light modulator unit, so as to form a second image as said image to be displayed on a light incident side of said first light modulator unit;
wherein said projection lens device includes:
a first mirror having a rotationally asymmetric reflection surface, and
a projection lens, including:
a first group of projection lenses, including a first lens having at least one rotationally asymmetric lens surface located on the second light modulator side of said first mirror, and
a second group of projection lenses, having a positive refraction power as a whole thereof, disposed successively in an order direction from an incident surface of said first light modulator unit, for forming an enlarged image to said second light modulator unit, and
wherein at least one portion of a plane mirror is disposed between said first mirror and said first light modulator unit; and
wherein the brightness of each of said first image and said second image is controlled, respectively, such that said second image can be seen transparently through said first image; and
wherein both said first image and said second image are displayed on a plurality of display surfaces located at a variety of depth positions as seen by an observer, and displayed with differing brightness that differs based upon depth positions as seen by the observer.

14. A three-dimensional (3D) image display apparatus, for displaying two-dimensional (2D) images on a plurality of display surfaces differing in depth position thereof, respectively, comprising:
a first light modulator unit, configured to apply a transmission-type liquid crystal display panel therein, provided at a side closest to an observer, and configured to modulate a light incident thereon, in response to a first video signal, thereby forming a first image; and
a projection image forming apparatus, wherein said projection image forming apparatus is configured to form a second image on a light incident side of said first light modulator unit, so as to obtain a plurality of display images located at positions different depth positions as seen from an observer position, and including:
at least one second light modulator unit, configured to modulate an intensity of a light from a light source depending on a video signal, and
a projection lens device, configured to enlarge said second image by projecting the image obtained by said second light modulator unit;
wherein the second image obtained by said projection image forming apparatus is a 2-dimensional (2D) image obtained by projecting a display object from a predetermined direction, and said first image is formed by modulating a flux of said second image in the first light modulator unit, wherein said first image is a 2D image formed from a video signal different from said second image;
wherein the brightness of each of said first image and said second image is controlled, respectively, such that said second image can be seen transparently through said first image; and
wherein both said first image and said second image are displayed on a plurality of display surfaces located at a variety of depth positions as seen by an observer, and displayed with differing brightness that differs based upon depth positions as seen by the observer.

15. The 3-dimensional (3D) image display apparatus, as described in the claim 14, wherein
said second image obtained by said projection image forming apparatus is applied as a 2-dimensional (2D) image, obtained by projecting the display object from a visual axis direction of one eye of the observer, while forming said first image by modulating the flux of said second image within said first light modulator unit, and said first image is applied as a 2-dimensional (2D) image, obtained by projecting the display object from a visual axis direction of the other of eyes of the observer, whereby enabling display of a 3-dimensional (3D) image.

16. The 3-dimensional displaying apparatus, as described in the claim 14, further comprising:
a polarized light converter unit, configured to convert the light from said light source into a desired polarization component;

wherein said second light modulator unit modulates an intensity of the light from said polarized light converter unit corresponding to the video signal.

17. The 3-dimensional (3D) displaying apparatus, as described in the claim 14, wherein a size of said first image and a size of said second image are changeable, independently from each other.

18. The 3-dimensional (3D) displaying apparatus, as described in the claim 14, wherein a brightness of said second image is lower than that of said first image.

19. The 3-dimensional (3D) image display apparatus, as described in the claim 15, further comprising:
   a polarized light converter unit, configured to convert the light from said light source into a desired polarization component;
   wherein said second light modulator unit modulates an intensity of the light from said polarized light converter unit corresponding to the video signal.

20. The 3-dimensional (3D) image display apparatus, as described in the claim 15, wherein a brightness of said second image is lower than that of said first image.

\* \* \* \* \*